US008789802B2

(12) United States Patent
Springer et al.

(10) Patent No.: US 8,789,802 B2
(45) Date of Patent: Jul. 29, 2014

(54) TABLET COMPUTING DEVICE SYSTEM

(75) Inventors: Martin A. Springer, Seattle, WA (US); Jeremy Ellison, Bothell, WA (US); Jake Levine, Seattle, WA (US)

(73) Assignee: Stand For Stuff LLC, Seattle, WA (US)

( * ) Notice: Subject to any disclaimer, the term of this patent is extended or adjusted under 35 U.S.C. 154(b) by 477 days.

(21) Appl. No.: 13/077,838

(22) Filed: Mar. 31, 2011

(65) Prior Publication Data

US 2011/0240448 A1    Oct. 6, 2011

Related U.S. Application Data

(60) Provisional application No. 61/320,640, filed on Apr. 2, 2010.

(51) Int. Cl.
*F16M 13/00* (2006.01)
*F16M 11/14* (2006.01)
*F16M 11/20* (2006.01)
*F16M 11/04* (2006.01)

(52) U.S. Cl.
CPC ........... *F16M 11/14* (2013.01); *F16M 11/2064* (2013.01); *F16M 2200/024* (2013.01); *F16M 2200/044* (2013.01); *F16M 11/041* (2013.01); *F16M 13/00* (2013.01)
USPC .................. 248/181.1; 248/288.31; 248/125.9

(58) Field of Classification Search
USPC ......... 248/447, 451, 453, 458, 459, 917, 919, 248/921, 922, 923, 125.9, 181.1, 181.2, 248/182.1, 288.31, 288.51, 514, 515, 516; 281/45; 361/679.02, 679.06; 211/126.1, 132.1
See application file for complete search history.

(56) References Cited

U.S. PATENT DOCUMENTS

| | | | |
|---|---|---|---|
| 6,201,688 B1* | 3/2001 | Leman | 361/679.27 |
| 6,239,968 B1* | 5/2001 | Kim et al. | 361/679.56 |
| 6,445,577 B1* | 9/2002 | Madsen et al. | 361/679.3 |
| 7,017,243 B2* | 3/2006 | Carnevali | 24/523 |
| 7,336,258 B1 | 2/2008 | Goetsch et al. | |
| 7,886,903 B1* | 2/2011 | Wurzelbacher et al. | 206/320 |
| 8,020,829 B1* | 9/2011 | Tamayori | 248/447.2 |
| 8,230,992 B2* | 7/2012 | Law et al. | 206/320 |
| 8,281,924 B2* | 10/2012 | Westrup | 206/320 |
| 8,317,152 B1* | 11/2012 | Zhou | 248/596 |
| 2004/0190238 A1* | 9/2004 | Hubbard | 361/683 |
| 2007/0297149 A1 | 12/2007 | Richardson et al. | |
| 2009/0314400 A1 | 12/2009 | Liu | |
| 2013/0078855 A1* | 3/2013 | Hornick et al. | 439/571 |

OTHER PUBLICATIONS

EP Office Action for Application 11714197.8 dated Jul. 24, 2013, the counterpart to U.S. Appl. No. 13/077,838, 5 pages.
Google Answers, "Q: Product Wanted—Home Automation—Remote Controlled Physical Button Pusher", Apr. 2005, 4 pages.

* cited by examiner

*Primary Examiner* — Steven Marsh
(74) *Attorney, Agent, or Firm* — Lee & Hayes, PLLC

(57) ABSTRACT

A protective case system for a tablet computing device is described herein. The protective case enables a person that does not want to or is physically unable to hold a tablet computing device to interact with an inserted tablet computing device. In addition to the foregoing, other aspects are described in the claims, description, and drawings that form this document.

12 Claims, 22 Drawing Sheets

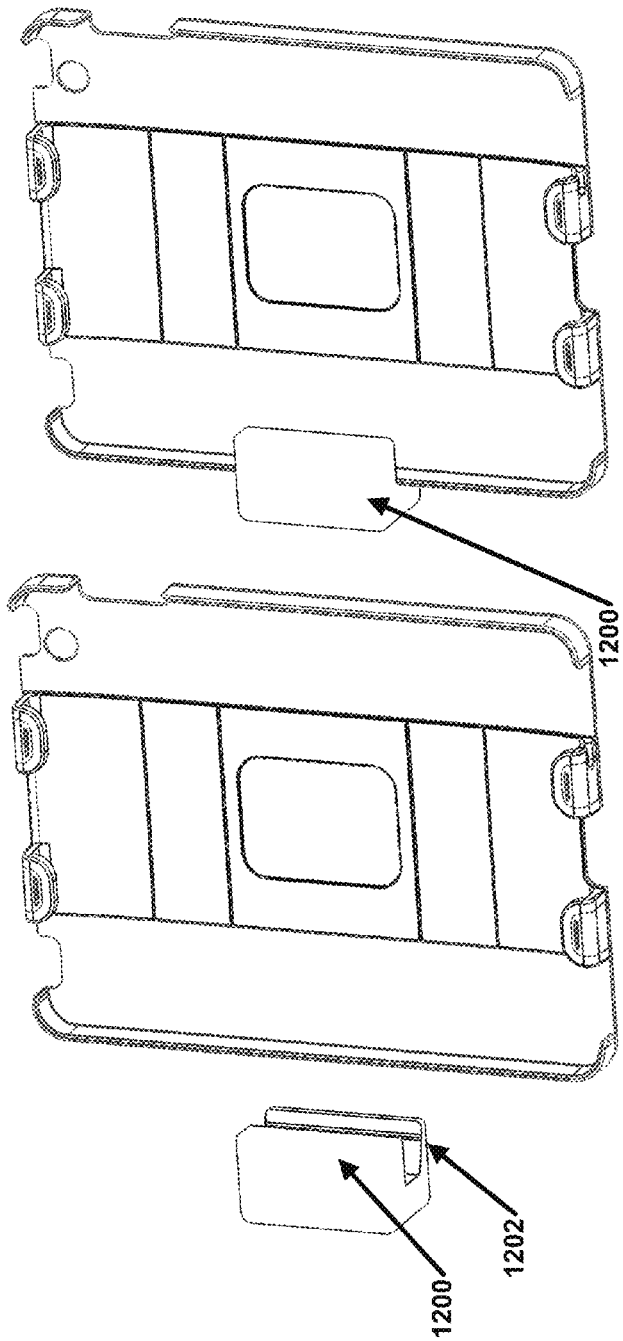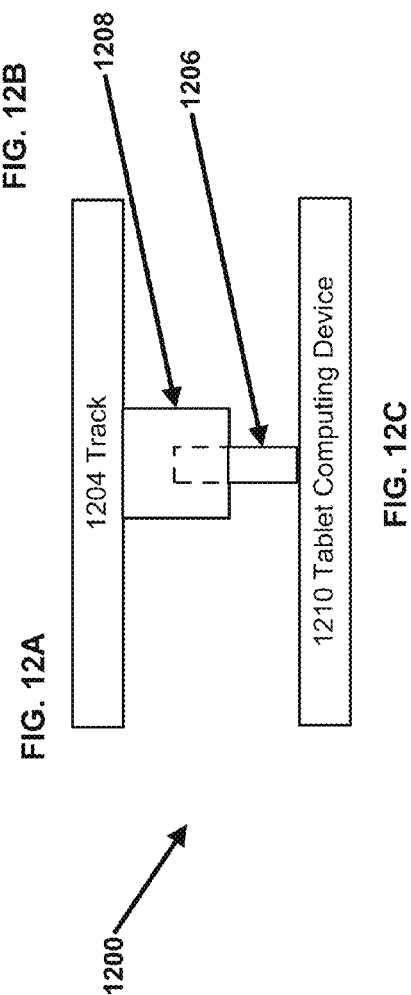

TABLET COMPUTING DEVICE SYSTEM

CROSS REFERENCE TO RELATED APPLICATIONS

This application claims benefit under 35 U.S.C. §119(e) of provisional U.S. patent application No. 61/320,640, filed Apr. 2, 2010, the contents of which are incorporated herein by reference in its entirety.

BACKGROUND

Tablet computing devices, such as e-book readers (electronic devices that are specifically designed to display digital media objects indicative of otherwise printed books, video, newspapers, etc.), are becoming increasingly popular devices because of portability, the readability of the screens, the ability to rapidly obtain new media, e.g., via wireless connections to the Internet. In addition to the foregoing, tablet computing devices are very easy to use because of intuitive user interfaces. For example, tablet computing devices typically include a few buttons that correspond to a few key functions (on/off, page forward, page backward, etc.). By distilling user interface down to a set of easy to use keys operation of the tablet computing device can be mastered by even the least technically-savvy users.

SUMMARY

An exemplary embodiment describes a protective case for a tablet computing device. In an exemplary configuration, the case can be formed from a first housing and a second housing coupled to the first housing. The second housing can be rotated relative to the first housing into an opened configuration. When in the open configuration, a tablet computing device can be inserted therein.

An exemplary embodiment describes an electronics module that can be coupled to the case. The electronics module can be configured to receive a signal, e.g., wireless, auditory, etc., indicative of a command; and cause a button pusher to engage a button (virtual or physical) of a tablet computing device. In an exemplary embodiment, the electronics module can be removably coupled to the back side of the case and a portion of the electronics module (including the button pusher) can curl over a part of the front side of the case such that the button pusher is suspended over a portion of the tablet computing device that includes a button. In response to the signal indicative of the command, the button pusher can strike the button of the tablet computing device. In another configuration, the electronics module can be removably coupled to the front side of the protective case and a portion of the electronics module can extend over a part of the front side of the case such that the button pusher is suspended over a portion of an interested tablet computing device.

It can be appreciated by one of skill in the art that one or more various aspects of the disclosure may include but are not limited to circuitry and/or programming for effecting the herein-referenced aspects of the present disclosure; the circuitry and/or programming can be virtually any combination of hardware, software, and/or firmware configured to effect the herein-referenced aspects depending upon the design choices of the system designer.

An exemplary embodiment describes a stand. The protective case can be optionally coupled to the stand. The stand can include a base or be attached to another reference point such as a chair, a bed, a wall, etc.

The foregoing is a summary and thus contains, by necessity, simplifications, generalizations and omissions of detail. Those skilled in the art will appreciate that the summary is illustrative only and is not intended to be in any way limiting.

BRIEF DESCRIPTION OF THE DRAWINGS

FIG. 12A illustrates an electronics module 1200 proximal to protective case 300.

FIG. 12B illustrates an electronics module 1200 removably coupled to protective case 300.

FIG. 12C illustrates a side view of an exemplary electronics module 1200.

DETAILED DESCRIPTION

Figure 1:
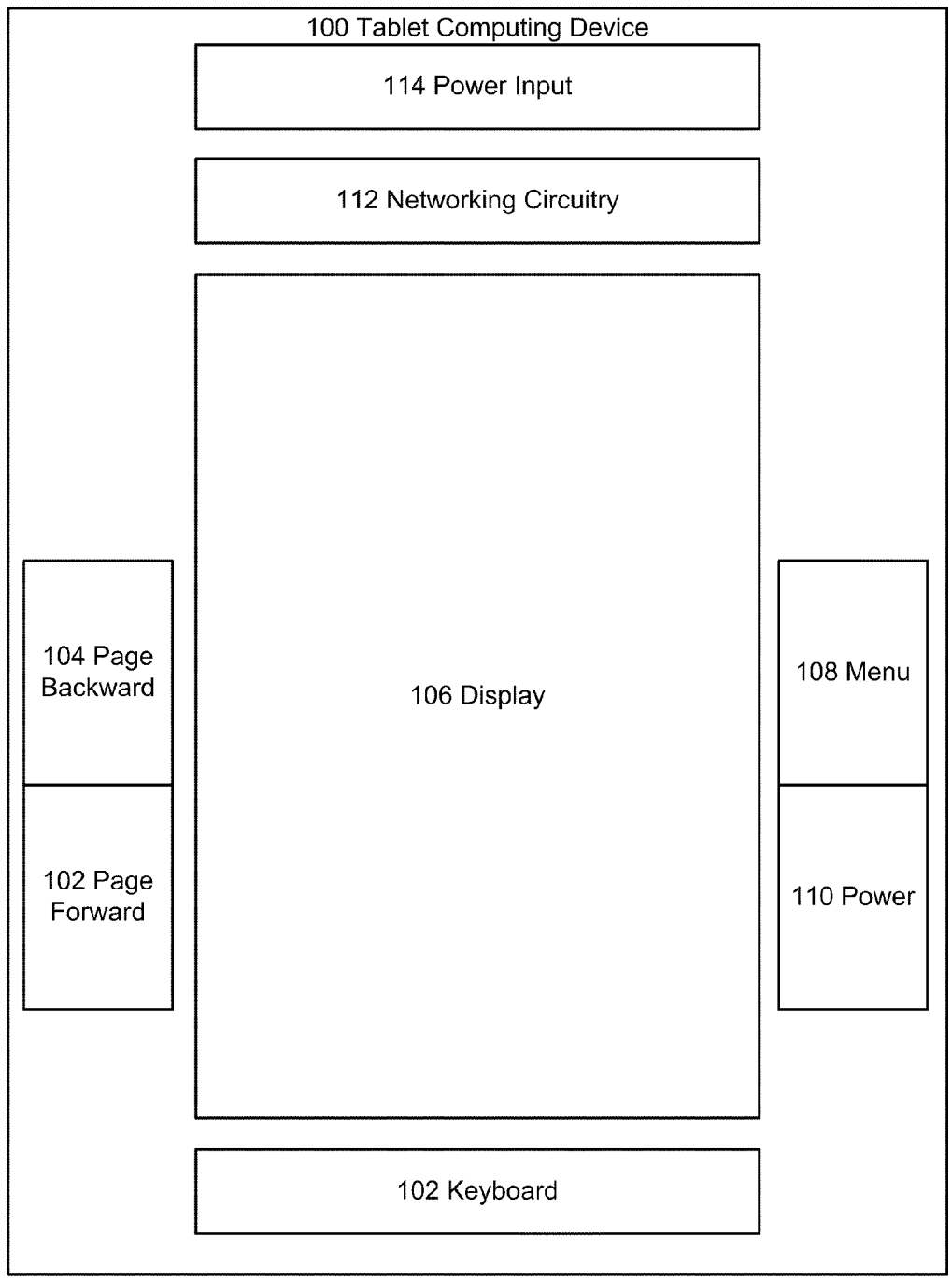
FIG. 1 illustrates an exemplary tablet computing device having a physical interface thereof.

This document describes a system that can be used to operate a tablet computing device. The herein described system can be used to help a person that does not want to or is unable to hold a tablet computing device. For example, a user suffering from cerebral palsy may be incapable of holding a tablet computing device or may not want to hold such device because doing so is uncomfortable. Rather than holding a tablet, the user can use the system to hold the tablet. Thus, the user can enjoy movies, e-books, access to the Internet, etc., without having to hold the tablet computing device.

The system can include a protective case. In an exemplary configuration, the protective case can be formed from resilient materials such as hard plastic, etc. The protective case can include retainers that hold an inserted tablet computing case in place. The retainers can be formed from rubber over-molding and/or hard plastic and can include an inner side lined with felt, rubber or the like that may protect an inserted tablet computing device in the event that the protective case is dropped, or the like. In an exemplary configuration, a transparent membrane can cover the front of the protective case. As such, the transparent membrane can prevent the tablet computing device from falling out of the protective case while allowing a user to interact with it while protecting the protective case. The protective case can include apertures to expose physical controls, cameras, and/or any ports of an inserted tablet computing devices.

Since each type of tablet computing device may be a different size, and may include different buttons in different locations, many different sized cases can be made in order to accommodate different shaped tablet computing devices. As such, the form factor of protective case 300 can be designed to have form factors that fit any tablet computing device, a non-exhaustive list of tablet computing devices including: the Kindle®, the XOOM®, the eGiver®, the Ipad® the Ipad2®, the Nook®, the Story®, the Cybook Opus®, etc.

The system can also include a stand. In one configuration, the stand can include a base that can be weighted to support the weight of the stand, protective case, and an inserted tablet computing device. In this configuration, the stand can be easily placed on a floor, desk, table, etc. In another configuration, the stand can be coupled to a bed (such as a hospital bed), a chair (such as a wheelchair), or a wall. In this exemplary embodiment, a user resting in a hospital bed can use the herein described system to interact with a tablet computing device to watch movies, read e-books, etc., without having to hold it.

In the same, or another embodiment, the stand can include cables that can couple a tablet computing device to external resources. For example, a power cord could run through the length of the stand and connect the tablet computing device to an outlet. In another embodiment, an Ethernet cable or some other type of communication cable such as a USB® cable can run through the length of the stand so that the tablet computing device can communicate with a computer system and/or a packet based network such as the Internet. In an exemplary embodiment, these cables can be run within a tube of the stand and connected to ports on an end of the stand configured to receive the protective case. The cord or cords can exit from the stand from the base or the like and can be plugged into various resources such as an electrical outlet, computer system, or an Ethernet port.

In an exemplary embodiment, the system can include one or more electronics modules that can be attached to the protective case. The electronics modules can extend over a least a portion of the front of an inserted tablet computing device and be used to remotely engage the buttons of the tablet computing device. Electronics modules can be configured to attach to the protective case by magnets, clasps, clamps, screws, bolts, protrusions, indentations, etc. Electronics modules can be configured to engage the buttons in response to user input such as voice, wireless signals, etc. Similar to the protective case, the electronics modules can come in various shapes and sizes depending on the form factor of the protective case and the tablet computing device. In this way each tablet computing device can have a set of one or more electronics modules that can be attached to the protective case to remotely engage the tablet computing device's controls. In addition to engaging buttons, an electronics module can include a position-adjustable light. The position-adjustable light can be positioned to shine on the display of the tablet computing device.

In an instance where software can be installed on the tablet computing device, a control program can be installed and used to remotely control the functions of an inserted tablet computing device. In this exemplary embodiment, the buttons (physical or virtual) may not have to be pressed to control the device. The control program can be controlled by user input such as voice, RF signals, and/or physical touch. In this embodiment, the software control program would be dependent on the application program interfaces exposed by an operating system of the tablet computing device. Consequently, whether or not such a software control program can be installed depends on the application program interfaces exposed and what software can be installed on the tablet computing device. This embodiment provides greater flexibility; however, the manufacturer of the tablet computing device could change the operating system or restrict the APIs that can be accessed by third party software to block the functionality of a control program.

Figure 2:
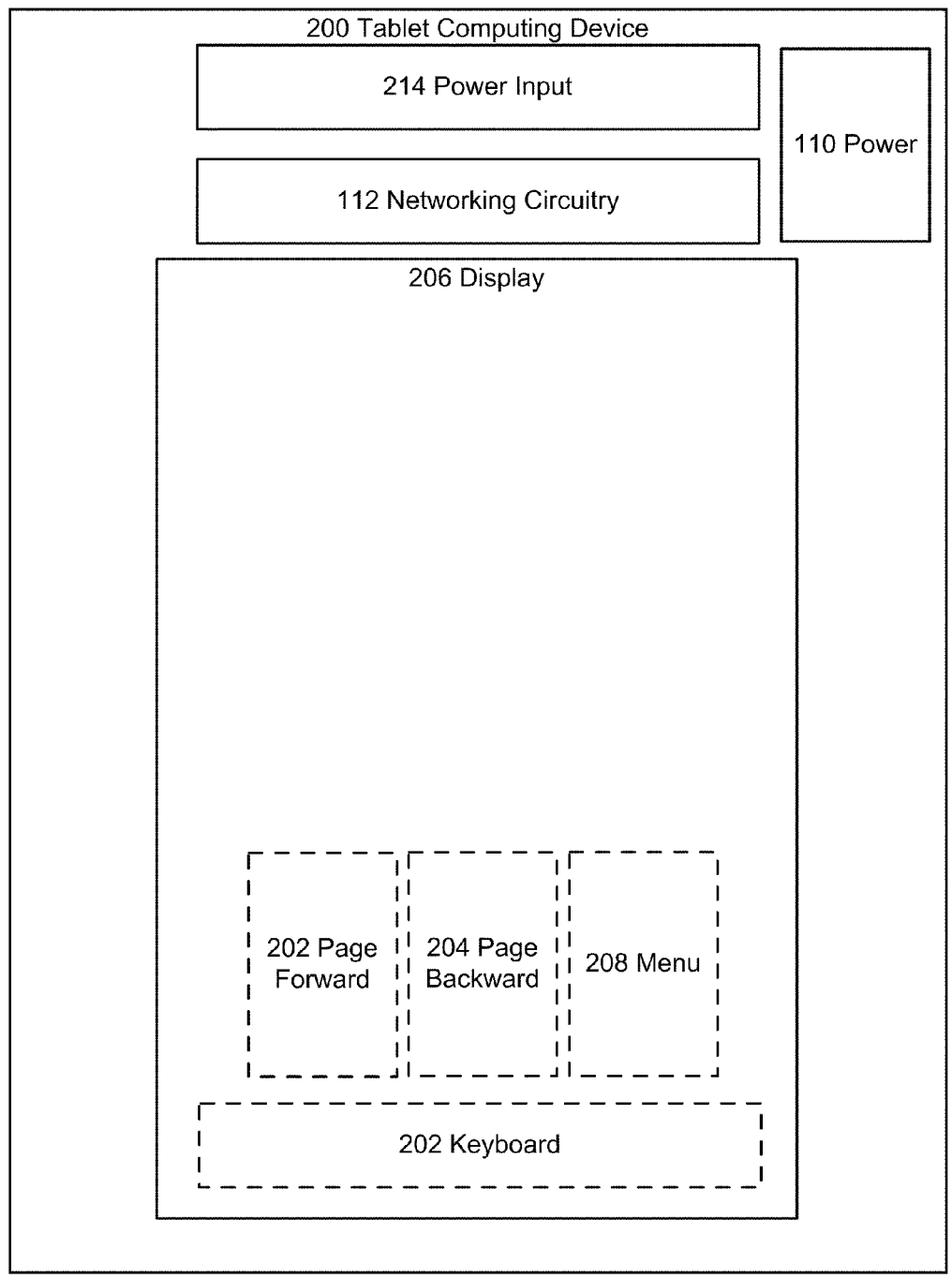
FIG. 2 illustrates an exemplary tablet computing device.

Turning now to FIG. 1 and FIG. 2, these figures illustrate tablet computing devices that can be used with the system described in the following paragraphs. FIG. 1 illustrates an exemplary tablet computing device, which could be an e-book reader such as a Kindle® from Amazon.com®. The tablet computing device 100 can include a processor (not shown), memory (not shown) in communication with the processor, and a battery (not shown) configured to supply power to the various electronic components of tablet computing device 100. The memory can include persistent memory such as a hard drive or non-volatile solid state memory and volatile memory such as RAM. As shown by the figure, tablet computing device 100 can include display 106. In one instance, display 106 can be configured to display e-ink based books and periodicals. Exemplary tablet computing device may 100 measure around 8 inches×5.3 inches×0.4 inches and weighs around 10 ounces. Memory of tablet computing device can be large enough to store thousands of media objects. Networking circuitry 112 can include wire-based ports and/or wireless transceivers. Networking circuitry 112 can be used to send/receive information such as media objects or other packet based information to/from a remote computer system. In at least one embodiment of the present disclosure, networking circuitry 112 can be configured to receive commands from a remote control. Power input 114 can be operable to receive power from, for example, a cord coupled to an electrical outlet. In another exemplary embodiment power can be received from a magnetic field. In this specific example, the protective case can include a mat with an induction coil. The induction coil can be used to create an alternating electromagnetic field and a second induction coil attached to tablet computing device 100 can take power from the electromagnetic field and convert it into electrical current to charge the battery.

Continuing with the description of FIG. 1, tablet computing device 100 can include physical controls such as a keyboard 102, a page backward control 104, a page forward control 102, a power control 110, and a menu control 108. In the illustrated embodiment, the controls can be physically engaged by a user and an operating system can process the input and perform a function. For example, page forward control 102 can be coupled to an interrupt line attached to the processor. When the control is pushed the interrupt line can go high and the processor can receive a signal. The processor can run the operating system and determine that the page needs to be advanced. The operating system can then advance the page of the displayed media object and clear the interrupt line.

Turning now to FIG. 2, illustrated is another exemplary tablet computing device 200. Tablet computing device 200 has similar components to that of tablet computing device 100, however in this exemplary embodiment, display 206 may be a touch-based user interface and controls 202, 204, and 208 are illustrated in dashed lines to indicate that they may be capacitive based. In this example, graphics indicative of controls can be displayed by display 206. When display 206 is touched by a capacitive object, e.g., a finger or a button pusher with a capacitive based end, display 206 detects the location and determines if a control is displayed at the location. A signal can then be sent to the processor which can run an operating system in response. The operating system can determine what function corresponds to the graphic and perform the function associated with the touched graphic control.

Figure 3:
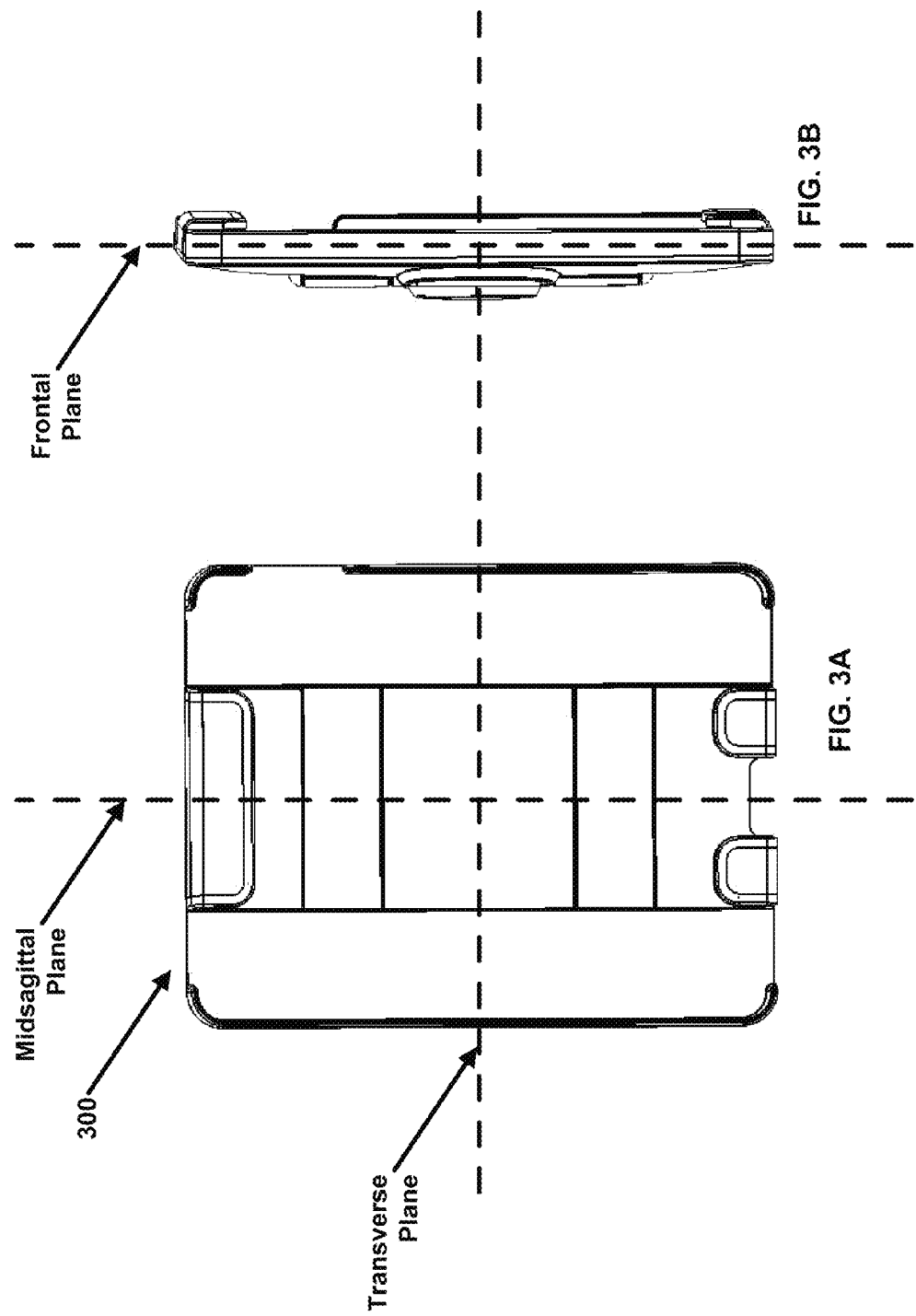
FIGS. 3A and 3B illustrate a front view and a side view of the exemplary protective case as well as planes of reference.

Turning now to FIGS. 3A and 3B, it illustrates a front and side view of an exemplary protective case 300 and various planes of reference. As such, FIG. 3A shows an imaginary midsagittal plane that can run through the middle of protective case and split protective case 300 into right and left sides. A transverse plane, which is an imaginary plane that divides protective case 300 into superior and inferior parts, is shown running horizontally across FIGS. 3A and 3B. A frontal plane is shown by FIG. 3B as an imaginary vertical plane that divides protective case into front and back sections.

Figure 4:
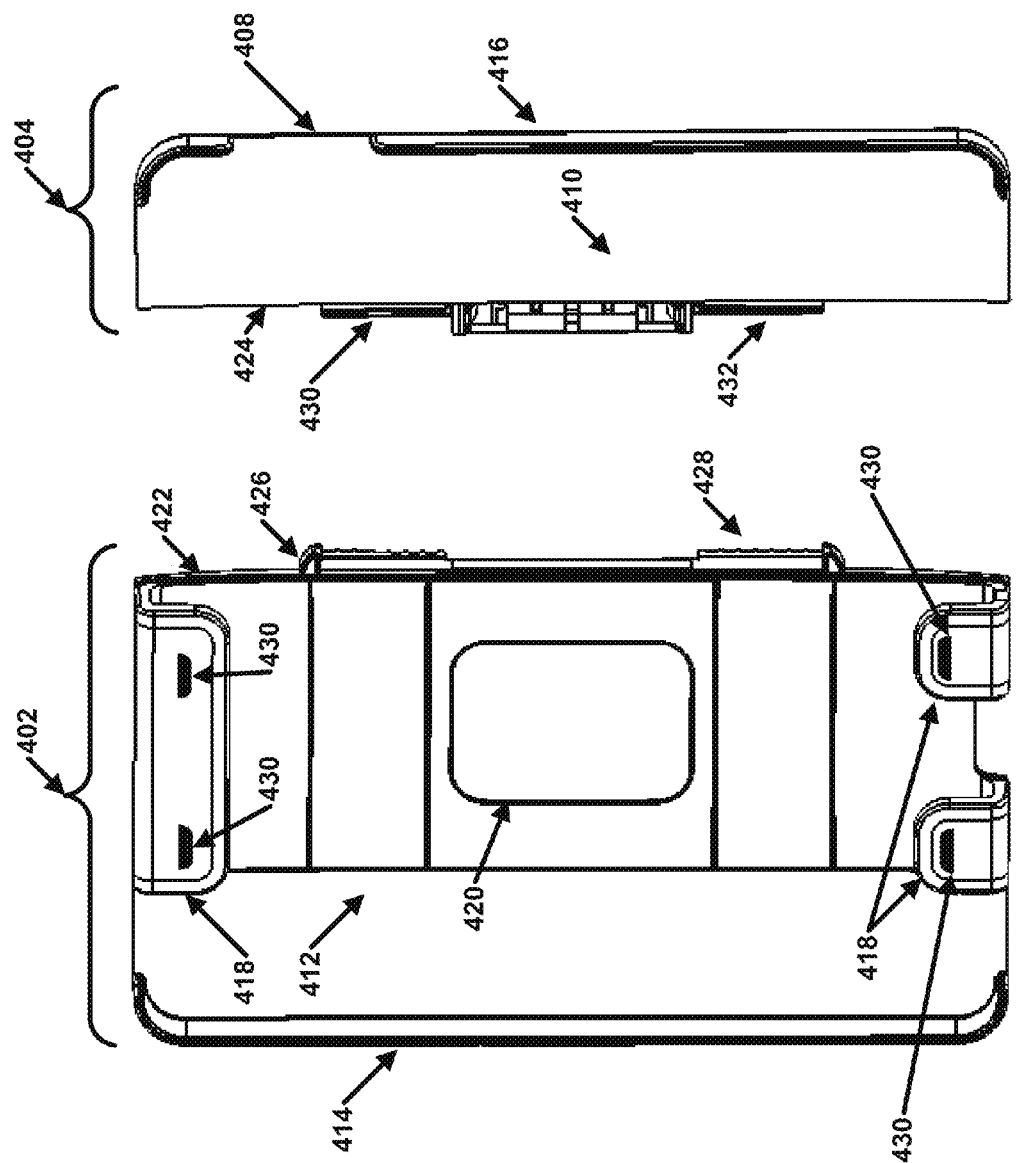
FIG. 4 illustrates a prospective view of an exemplary first housing and an second housing.

Turning to FIG. 4, it illustrates two housings that can be used to form the exemplary protective case 300. According to this embodiment, protective case 300 can be formed from first housing 402 and second housing 404 coupled together by hinging means, which are described in more detail in the following paragraphs. Briefly, first housing 402 and second housing 404 can be made from any suitable rigid material that can physically protect the tablet computing device from damage caused by impact. In an exemplary embodiment, the rigid material can be hard plastic, metal, or any other material that can be molded/formed into a shape similar to protective case 300.

As shown by FIG. 4, each housing of protective case 300 can have a front surface 410 and 412. Each front surface 410 and 412 can be formed of hard plastic and can be covered with a layer of rubber over-molding, which can protect the back side of an inserted tablet computing device, e.g., an Ipad 2®. A rubber over-molding process can be used to form retainer 414 and 416, which are shown protruding in a direction perpendicular to the frontal plane from the left side of first housing 402 and the right side of second housing 404. In an exemplary embodiment, retainers 414 and 416 can wrap around the corners of front surfaces 410 and 412 and run along the edge of the posterior and anterior sides of protective case 300, i.e., retainers 414 and 416 can completely encircle protective case 300 and connect. Apertures can be made to retainers 414 and 416 to expose side buttons and/or ports of an installed tablet computing device, and to define a finger aperture 408, which can be used in order to grip an inserted tablet computing device to remove it protective case 300.

L-retainers 418 are also shown by the figure. These retainers can be formed by hard plastic and covered with rubber over-molding. L-retainers 418 can be made to extend inward in a direction perpendicular to the transverse plane, which divides protective case into superior and inferior parts. As such, a portion of each L-retainer is parallel to the frontal plane and hangs over a portion of an inserted tablet computing device. In a configuration where protective case 300 does not include a membrane covering the front, L-retainers 418 can be used to secure an inserted table computing device to protective case 300. Protrusions 430 are illustrated protruding from L-retainers 418. In an exemplary embodiment, a cap (not illustrated) can be attached to one or more protrusions 430 to reduce the space between the front surface 410 and a part of the L-retainer that is parallel to the frontal plane and hangs over front surface 410. The cap can be used to secure very thin tablet computing devices.

The undersides of L-retainers 418 can include a plurality of structural ribs that are approximately a millimeter tall, in an exemplary embodiment. The structural ribs reduce the amount of material that comes into direct contact with an inserted tablet computing device. In addition, since less surface area of an inserted tablet computing will be in contact with L-retainers, less force is needed to overcome friction forces that resist insertion and removal. While L-retainers are illustrated on the superior and inferior edges, in other configurations L-retainers can be formed into retainers 414 and 416. As such, the positioning of the L-retainers can be based on the type of tablet computing device the protective case is formed to secure. In particular, the positioning of the L-retainers can be based on the location of the buttons and ports on the tablet computing device and the dimensions of the tablet's screen.

Also shown is mat 420 with an induction coil. In this exemplary embodiment, protective case 300 can be configured to receive power from a stand. For example, back side of protective case 300 can connect to a power cord that can be hooked into a power outlet. The induction coil can be used to create an alternating electromagnetic field and a second induction coil attached to a tablet computing device (not shown) can take power from the electromagnetic field and convert it into electrical current to charge the battery in the tablet computing device.

Figure 5:
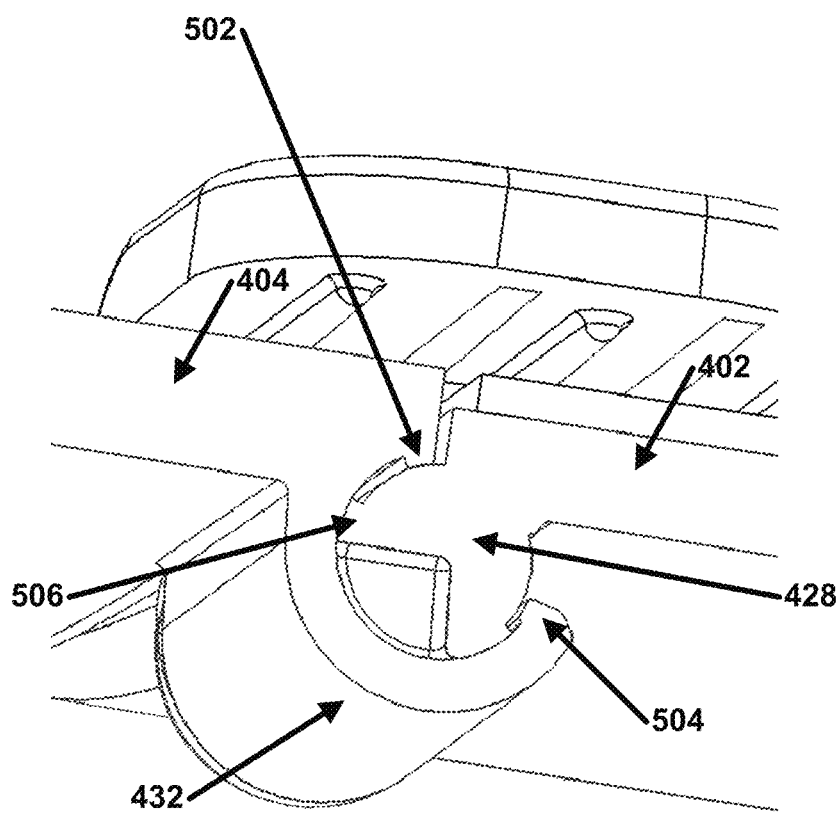
FIG. 5 illustrates a prospective view of an exemplary hinge.

First housing 402 and second housing 404 can be defined by four edges including first side 422 and second side 424. As shown by the figure, first side 422 can be formed to define barrels 426 and 428 and barrel-cylinders 430 and 432 can be formed into second side 424. In an exemplary configuration, barrel-cylinders 430 and 432 can attach to barrels 426 and 428 and form hinges that allow second housing 404 to rotate relative to first housing 402. Turning briefly to FIG. 5, it illustrates a side view of an exemplary hinge that could be formed by the combination of barrel 428 and barrel-cylinder 432. In this configuration, the hinge can limit the amount second housing 404 can rotate. The effect of this is that in an embodiment, the front surface 410 of first housing 402 and front surface 412 of second housing 404 form an acute angle relative to the position of second housing 404 in the closed position. Barrel-cylinder 432 can include hook 502 that can engage stop 506 when second housing 404 is rotated. Edge 504 can also restrict the amount second housing 404 can rotate. In an exemplary configuration, these hinge(s) can be configured to rotate second housing 404 approximately 30 degrees from a position substantially flush with first housing 402 in a direction towards the back of protective case 300.

Figure 6:
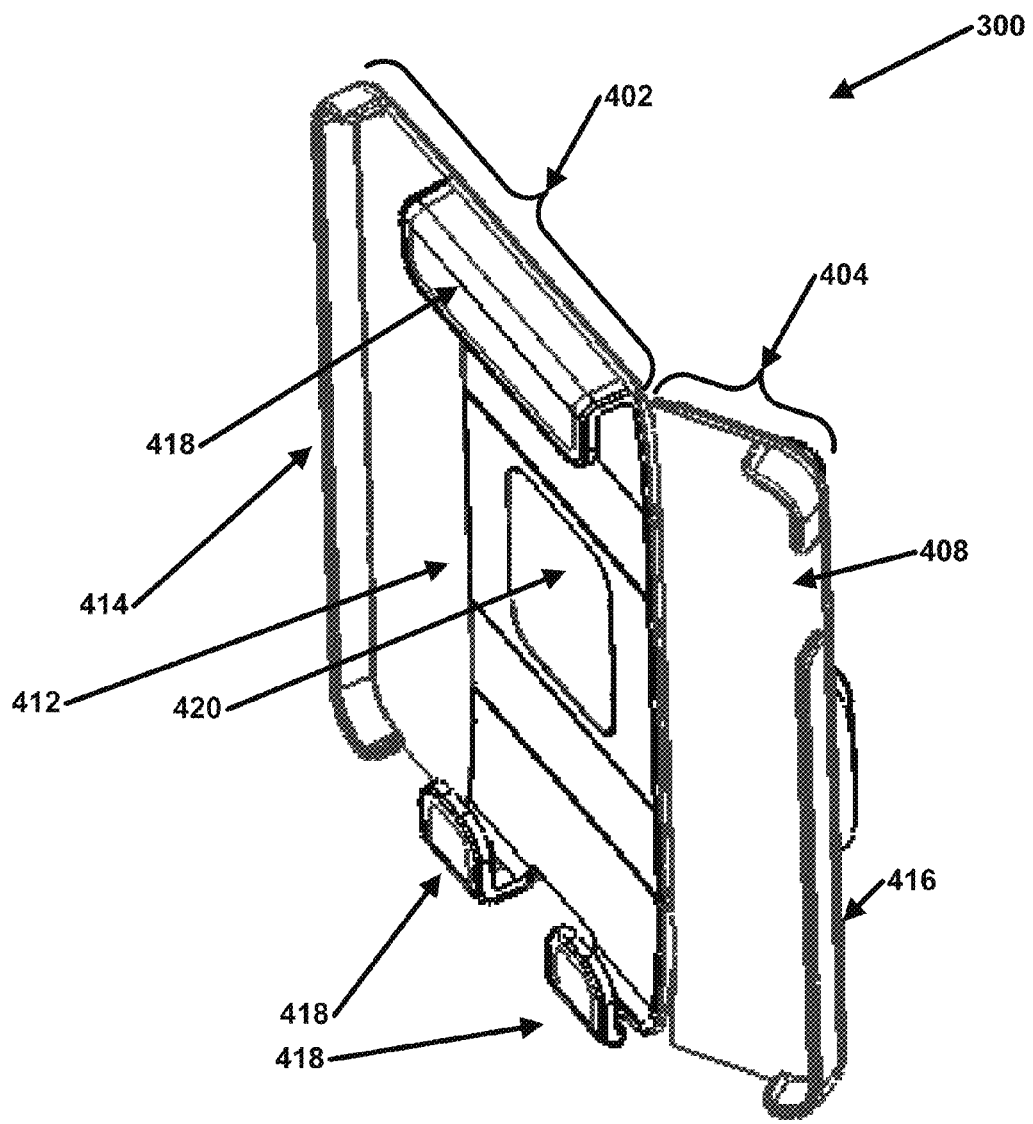
FIG. 6 is a prospective view of an exemplary protective case in an open configuration.

Referring now to FIG. 6, it shows protective case 300 in the open configuration. In this configuration, second housing 404 has been rotated relative to first housing 402 in order to expose a door that can be used to insert a tablet computing device such as a Kindle®. When protective case 300 is opened, a user can slide his or her tablet computing device into the door and across front surface 412 (and underneath the portion of L-retainers 418 that are parallel to front surface 412) until tablet computing device comes into contact with a retainer. In one configuration, the number of structural ribs on L-retainers 418 and the material on front surface 412 can be selected such that minimal force is needed to slide the tablet computing device into protective case 300. In addition, the distance needed to push tablet computing device for it to be inserted is reduced by the location of the hinges. For example, the closer the hinge is to the midsagittal plane, the less a user needs to push the tablet computing device in order to insert it and the less a user needs to pull the tablet in order to remove it. This feature helps a user suffering from cerebral palsy, Huntington's disease, or a condition that affects muscle strength and/or coordination use protective case 300 because he or she will not have to push a tablet computing device across front surface 412 of second housing 404. In a specific example, the hinge can be approximately half way between the midsagittal plane and right edge of second housing 404. Thus, first housing 402 may be approximately twice the size of second housing 404.

Figure 7:
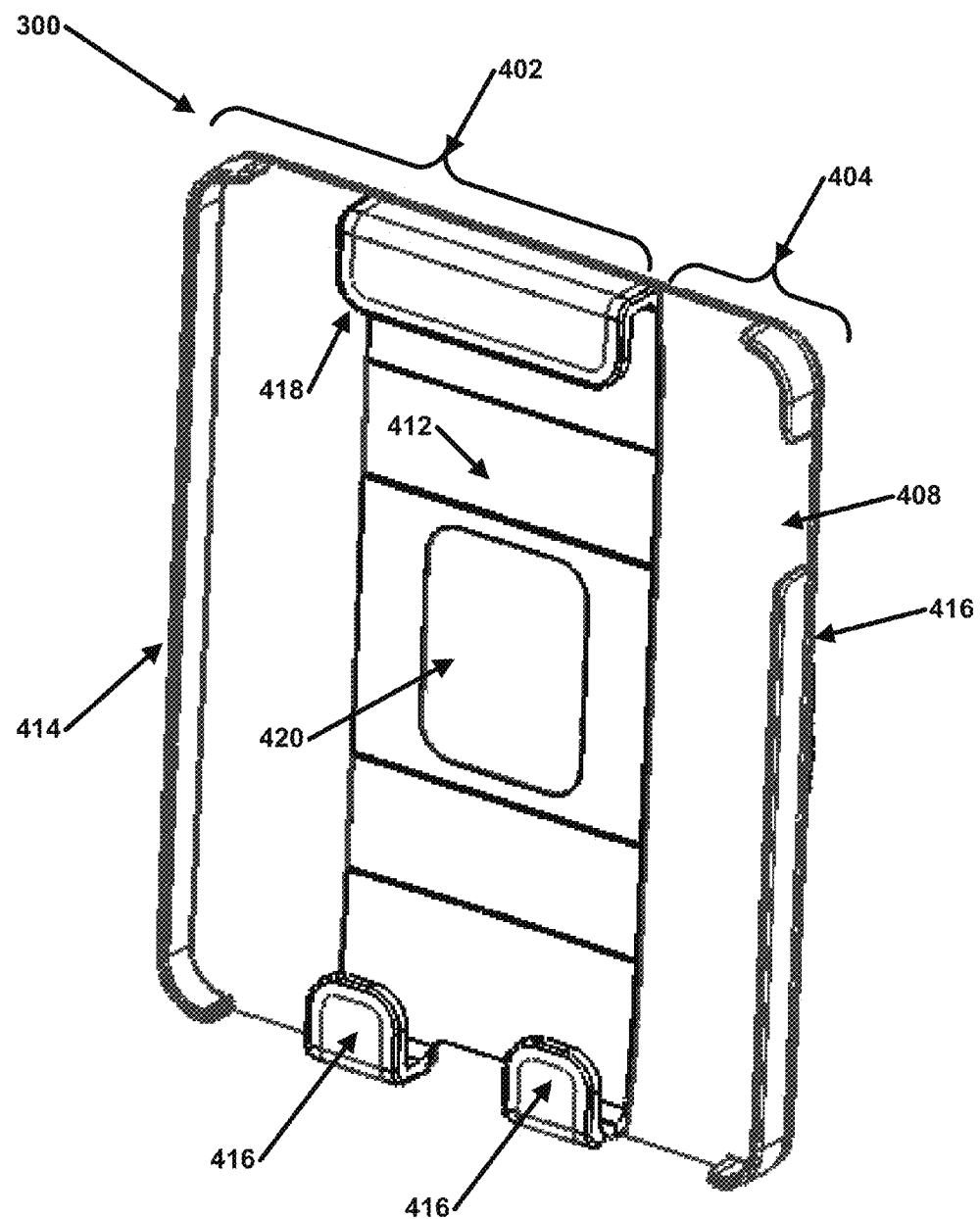
FIG. 7 is a prospective view of an exemplary protective case in an closed configuration.

The door can be closed by rotating second housing 404 about an axis (defined by the intersection of a plane parallel to a midsagittal plane and a plane parallel to a frontal plane) such that front surface 410 becomes substantially flush with front surface 412. Referring to FIG. 7, when the tablet computing device is in the closed configuration, movement of perpendicular to the midsagittal plane can be prevented by retainers 416 and 414 and movement in the transverse plane can be prevented by front surfaces 410 and 412 as well as L-retainers 418.

Turning back to FIG. 6, when removing the tablet computing device, second housing 404 can be rotated about the axis and the door can be opened. In the open configuration, a user can slide his or her index finger into finger aperture 408 and grab, using the right hand, the back of table computing device with a thumb and the front with an index finger. The user can then slide the tablet computing device in a direction perpendicular and away from the midsagittal plane in order to remove it. If protective case 300 is coupled to a stand a user may not have to use any other fingers or hands to remove the tablet computing device. Alternatively, when protective case 300 is in the open configuration it could be rotated clockwise about an axis defined by a plane parallel to the midsagittal plane and a plane parallel to the transverse plane 90 degrees and let gravity pull the tablet computing device from protective case 300. As one of skill in the art can appreciate based on the teachings described herein, protective case 300 according to this embodiment can be used by a user suffering from cerebral palsy, Huntington's disease, or a condition that affects muscle strength and/or coordination because a tablet computing device can be easily inserted or removed from protective case 300 by using, for example, two fingers.

Figure 8A:
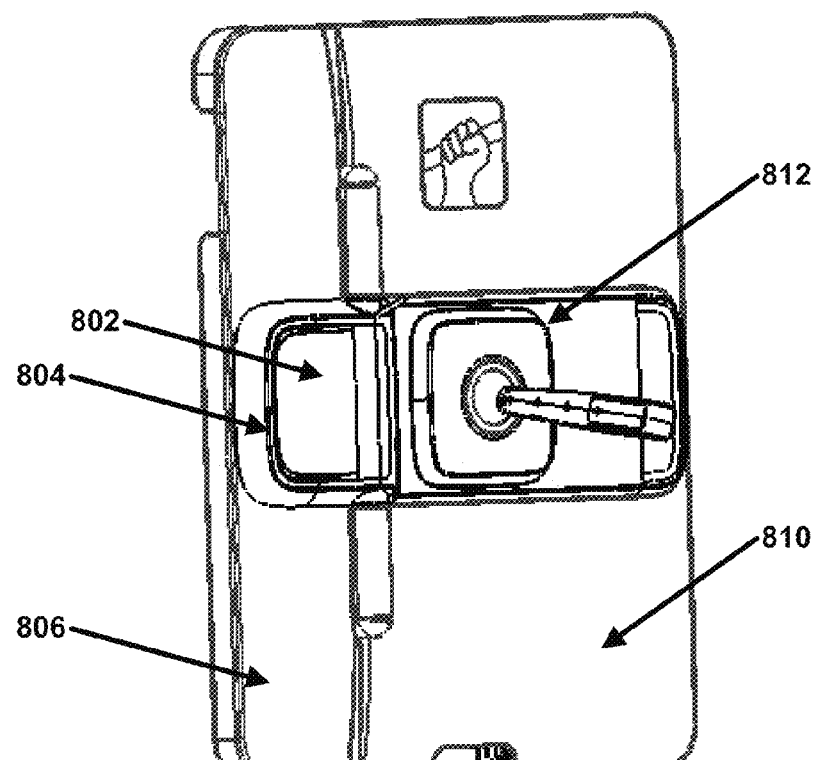
FIG. 8A illustrates the back protective case 300 in the open and locked configurations.
Figure 8B:
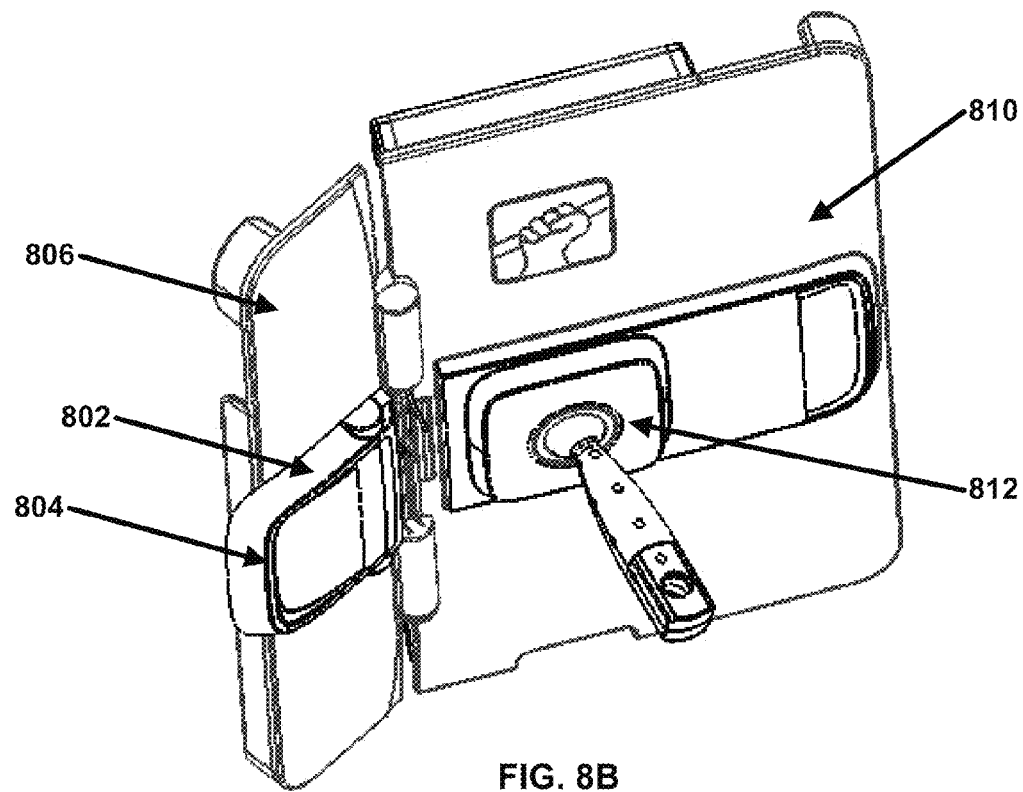
FIG. 8B illustrates the back protective case 300 in the open and unlocked configurations.

Referring now to FIGS. 8A and 8B, they illustrate the back of protective case 300 in the open and closed configuration. As shown by the figure, the back of protective case 300 can be formed from the combination of first back section 810 and second back section 806. Ball and socket mounting 812 can be removably attached to first back section 810 and coupled to a stand, which is described in more detail in the following paragraphs. As such, ball and socket mounting 812 can be attached to first back section 810 via one or more clamps, magnets, bolts, screws, snaps, etc. In this configuration, a user could remove protective case 300 from ball and socket mounting 812. Alternatively, ball and socket mounting 812 can be physically integrated into the back of protective case 300.

FIGS. 8A and 8B also show locking system 802. Locking system 802 can be operatively coupled to second housing 404 and can be configured to lock second housing 404 in the closed position. When locked, a proximal end (from the perspective of the midsagittal plane) of locking system 802 can cover the pivot point defined by a part of first housing 402. This locks protective case 300 in the closed position by preventing second housing 404 from rotating about the pivot point of the hinges. In an exemplary embodiment, the amount of force needed to actuate locking system 802 can be selected to take into account the possibility that users suffering from a condition that affects muscle strength and/or coordination may use protective case 300. As such, in an embodiment, locking system 802 can be configured to be unlocked with a single finger. For example, when a user wishes to open protective case 300 the user can curl the pad of an index finger around catch 804 on the end of locking system 802 and pull it in a direction perpendicular and away from the midsagittal plane. An average user may be able to exert 60 newtons of force. Thus, in an exemplary embodiment locking system 802 can be designed such that a force of less than 15 newtons is sufficient to move locking system 802. In a specific example, the force could be between 3N and 6N.

Applying a sufficient force to catch 804 causes locking system 802 to move to a point where locking system 802 is no longer covering a portion of first back section 810. When this occurs, a torsion pin (described in more detail in the following paragraphs) can exert a force on second housing 404 to rotate it from a position substantially flush with first housing 402 to the open position. As shown by the figure, locking system 802 can extend past the edge defined by second housing 404 when in the unlocked configuration. This provides a visual indicator for indicating that second housing 404 is not locked as well as something that a user can push to lock protective case 300.

Figure 9:
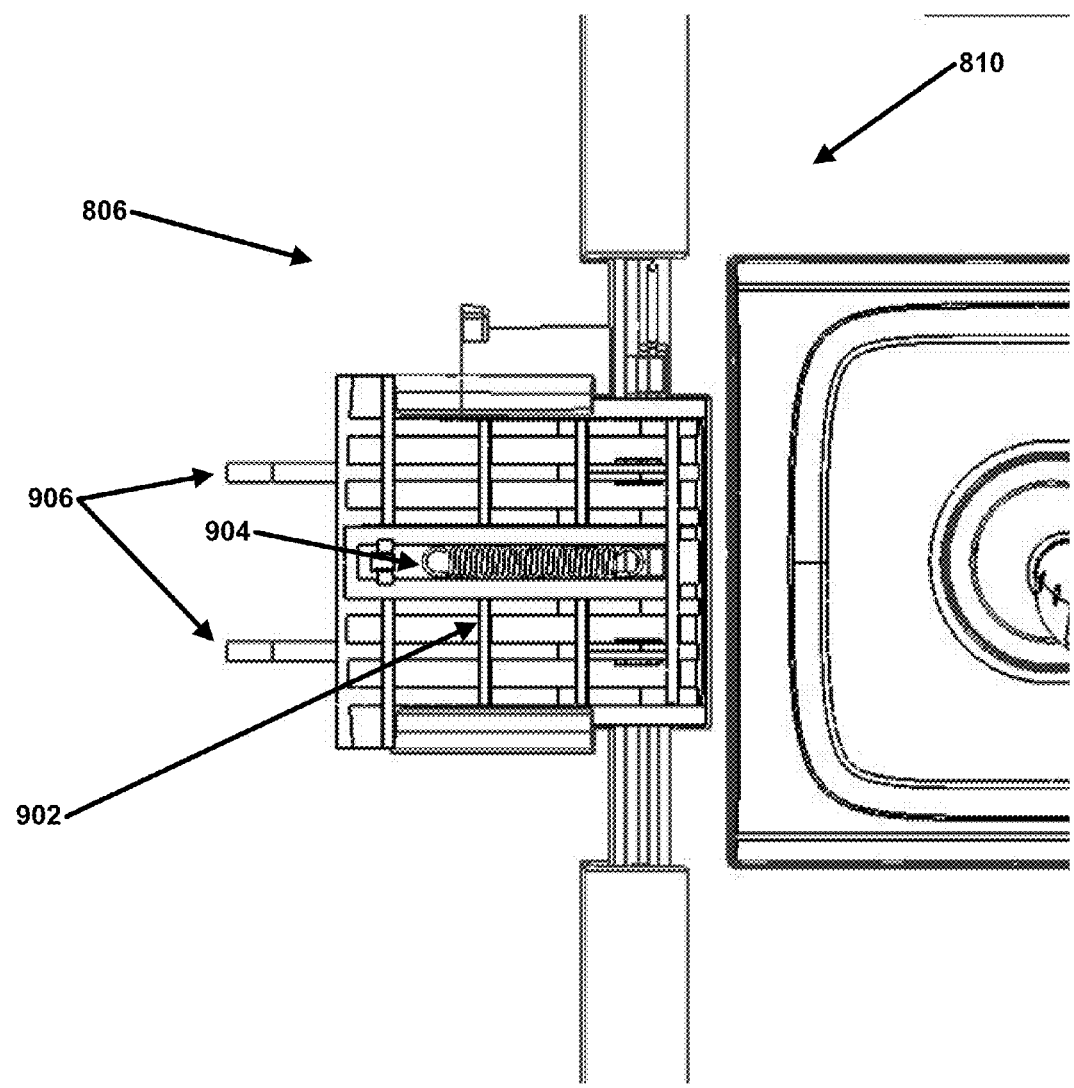
FIG. 9 illustrates an exemplary locking system in the locked configuration.
Figure 10:
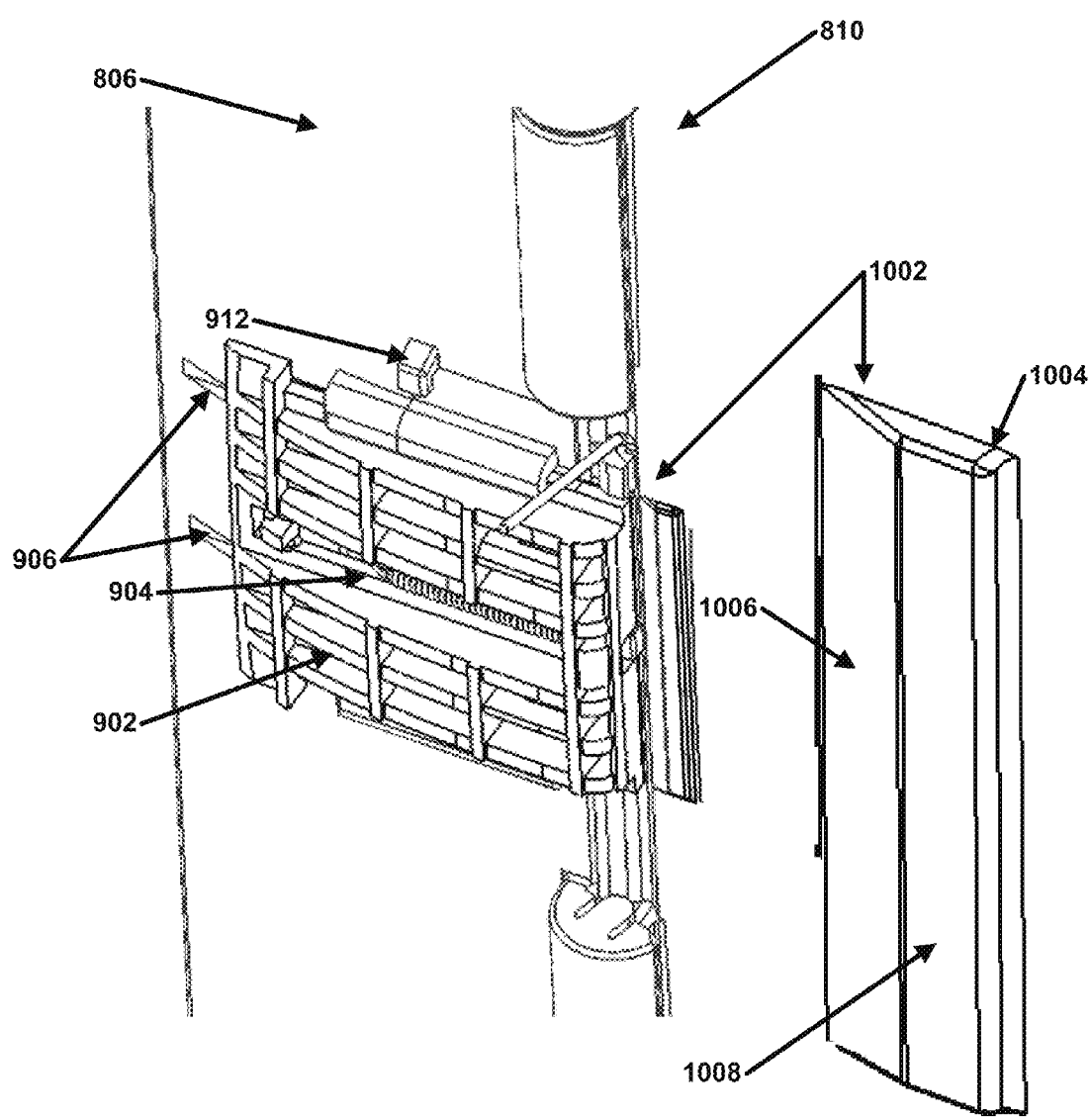
FIG. 10 illustrates an exemplary locking system in the unlocked configuration.

Referring now to FIGS. 9 and 10, these figures illustrate the operation of locking system 802 in more detail. Briefly, FIG. 9 shows locking system 802 without its cover and in the locked position; and FIG. 9 shows locking system 802 without its cover and in the open configuration. Turning now to FIG. 9, locking system 802 can include "T" shaped carriage 902, which can be formed from any ridged material such as hard plastic. When in the locked position, the proximal end (i.e., an end closest to the midsagittal plane) of carriage 902 can cover a part of first back section 810. Consequently, carriage 902 prevents second housing 404 from rotating relative to first housing 402 in this configuration.

FIG. 9 also shows spring 904. In an exemplary configuration, a proximal end of spring 904 (i.e., an end closest to the midsagittal plane) can be attached to second housing 404 and the distal end of spring 904 can be coupled to carriage 902 via a hook. Alternatively, the distal end of spring 904 can be coupled to a hook on second housing 806 and the proximal end can be coupled to carriage 902. In either configuration, spring 904, which could be a coil spring in a specific embodiment, can be configured to exert a force on carriage 902 pushing/pulling it in a direction parallel to a plane defined second back section 806. In the illustrated example, since second housing 404 is flush with first housing 402, spring 904 can exert a force on carriage 902 in a direction perpendicular and toward the midsagittal plane. Track 906 can guide carriage 902 as it moves in response to a force supplied from spring 904 and/or a force supplied from a user.

Turning now to FIG. 10, it illustrates locking system 802 in an unlocked configuration with second housing 404 substantially flush with first housing 402, i.e., second housing 404 in the closed position. Carriage 902 is illustrated in this figure as having been pulled in a direction away and perpendicular to the midsagittal plane to a position where the proximal no longer covers first back section 810. In addition to freeing second housing 404, this position exposes ramped stop 1002, which can be used to force carriage 902 in the locked configuration and can force second housing 404, when in the open configuration, into the closed configuration. As shown by the blown-up view of ramped stop 1002, it can include ramp 1006, flat section 1008, and ridge 1004. When articulating carriage 902 into the open configuration, a user can pull carriage 902 and a hook on the underside of carriage 902 can slide up and over ridge 1004 across flat section 1008 and down ramp 1006. The force that is required to move carriage 902 to the open configuration must be enough to overcome the force of spring 904 and the angle of ridge 1004.

In an exemplary embodiment, the height of flat section 1008 relative to first back section 810 can be selected such that the force exerted by spring 904 is sufficient to force carriage 902 into the locked configuration, but not enough force to prevent carriage 902 from easily being moved into the unlocked configuration. For example, if the height of flat section 1008 is too high, spring 904 may not be able to supply enough force to pull carriage 902 up ramp 1006. If, on the other hand, it is not high enough, ridge 1004 will not be able to hold it in the locked configuration. In a specific example, the flat section 1008 can be half a millimeter tall.

Figure 11:
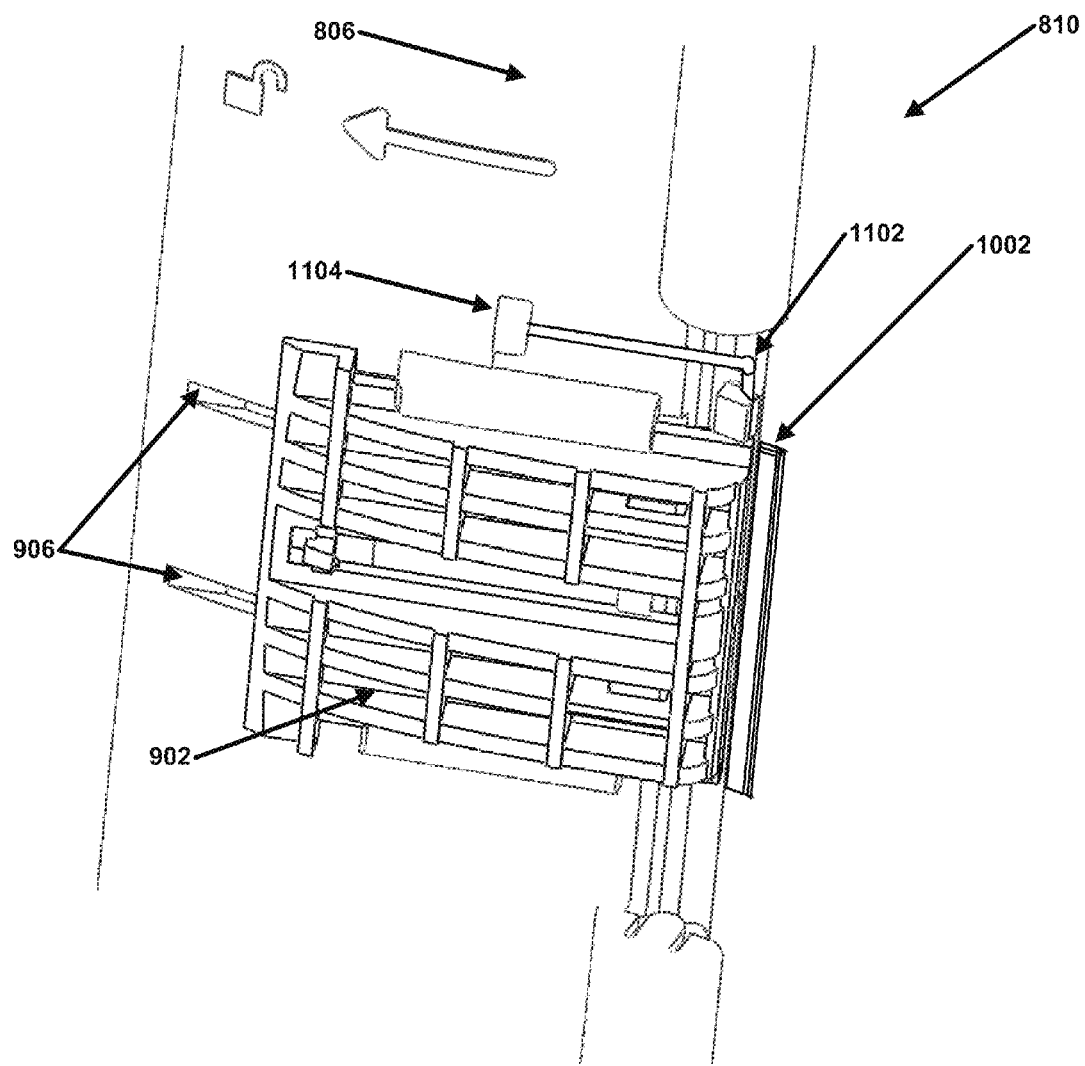
FIG. 11 illustrates the back of protective case 300 in an open configuration and an exemplary locking system in the unlocked configuration.

Turning to FIG. 11, it illustrates that when a user pulls locking system 802 away from the midsagittal plane to the unlocked configuration, torsion spring 1102 can exert a force on second housing 404 that causes it to rotate it about the axis into the opened position. For example, when the proximal end of carriage 902 passes the pivot point and it no longer holds second housing 404 flush with first housing 402, torsion spring 1102 can begin to rotate second housing 404. Torsion spring 1102 can be "L" shaped with a portion of the spring running parallel to the midsagittal plane within the pivot point and a portion extending in a direction perpendicular to the midsagittal plane. The portion extending in the direction perpendicular to the midsagittal plane can be locked in place by catch 1104 coupled to second back section 806. Torsion spring 1102 can make operation of protective case 300 easier for a user suffering from a condition that affects muscle control and/or strength because torsion spring 1102 opens protective case 300 after carriage 902 is no longer covering first back section 810.

As shown in by the figure, the proximal edge of carriage 902 can be flat such that when carriage 902 is in the unlocked configuration it engages ramp 1006, which acts like a stop. Since spring 904 is configured to provide a force that is parallel to a plane defined by second back section 806, when second housing 404 is in the open configuration spring 904 exerts a force on carriage 902 that forces it into ramp 1006. If a user were to rotate second housing 404 to the closed position, the direction of the force exerted by spring 904 will change from one where it is perpendicular to a plane parallel to the slope of ramp 1006 to one where it is perpendicular to the midsagittal plane. At this point, the force of spring 904 can cause carriage 902 to slide up ramp 1006; across flat section 1008, and into ridge 1004.

Turning to FIG. 12A-12C, these figures illustrate an embodiment where one or more electronics modules can be attached to protective case 300 in order to remotely manipulate the controls of a tablet computing device while it is secured by protective case 300. As shown by the figure, electronics module 1200 can include connecting means, which in a specific example can be flange 1202. Flange 1202 can protrude from electronics module 1200 and can snap over a rib on the back side of either first housing 402 or second housing 404 to secure electronics module 1200 to protective case 300. One skilled in the art can appreciate that different types of mounts can be used to attach electronics module to protective case 300. For example, in an alternative embodiment a clamp, a bolt, protrusions and indentations, or prongs, can be used to secure electronics module to protective case 300. In yet another exemplary embodiment electronics module 1200 can include a magnet that can be used to attach the module to protective case 300.

FIG. 12B illustrates that in an embodiment electronics module 1200 can be "U" shaped and a portion of electronics module 1200 can extend over front surface 412 and be parallel to a plane formed by front surface 412. Electronics module 1200 can include circuitry that can engage with an inserted tablet computing device in order to cause it to execute a function. Turning to FIG. 12C, it shows a side view of the circuitry of an exemplary electronics module 1200. In this example, electronics module 1200 can include track 1204. A motor can cause housing 1208 to move horizontally and/or vertically and a button pusher 1206 can extend from housing 1208 and engage either a button or touch screen of tablet computing device 1210 (tablet computing device 1210 can be a specific example of tablet computing device 100 or 200).

Figure 13:
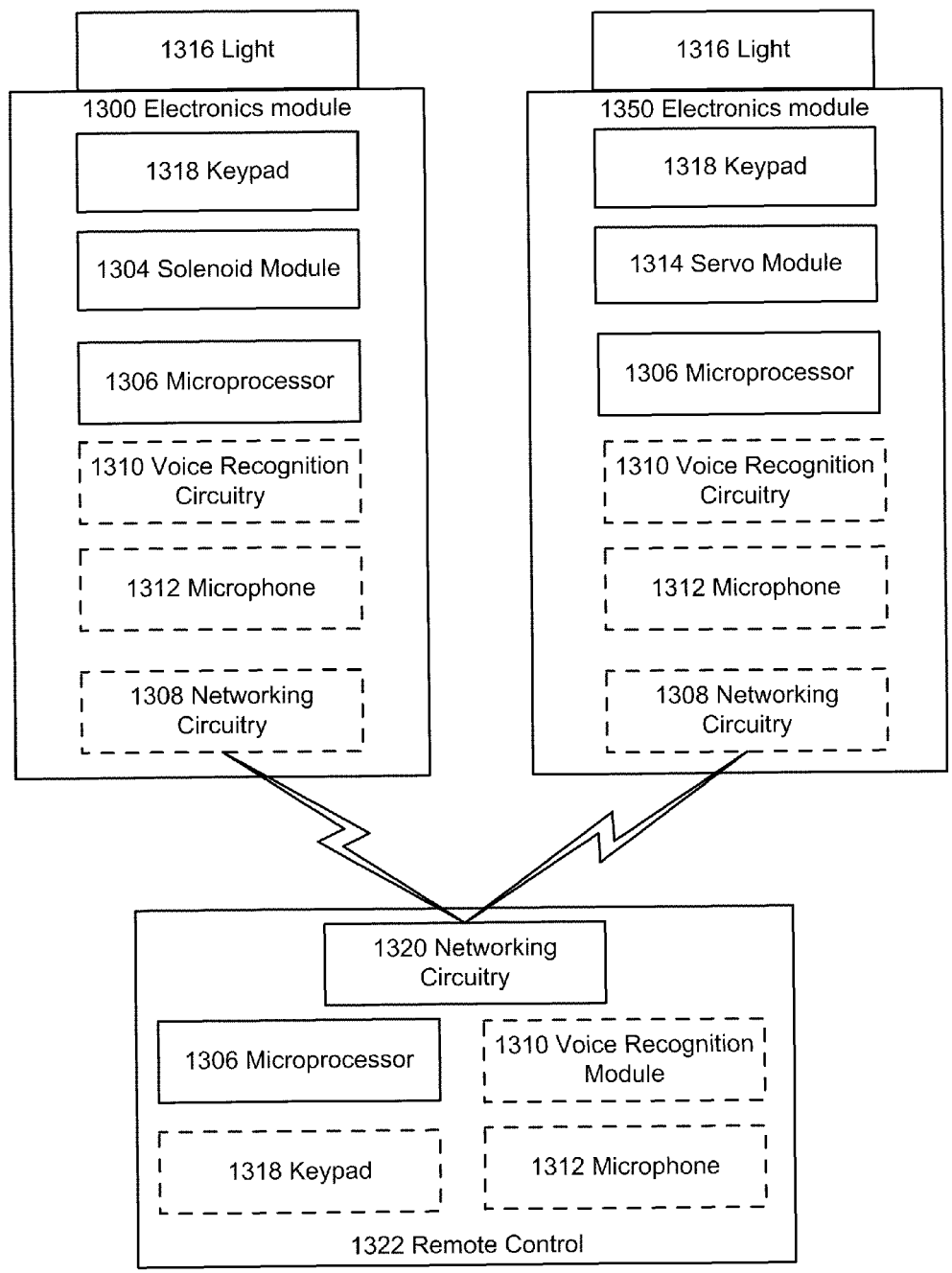
FIG. 13 illustrates functional block diagrams of exemplary electronics modules attached to protective case 300.

Turning now to FIG. 13, illustrated are functional block diagrams of exemplary electronics modules 1300 and 1350 that can be wirelessly controlled by a remote control 1322 used to physically manipulate controls of an exemplary tablet computing device. Certain features in FIG. 13 are indicated in dashed lines which is indicative of the fact that they are considered optional.

As shown by the figure, electronics modules 1300 and 1350 can each have networking circuitry 1308, light 1316, microprocessor 1306, keypad 1318, etc. Networking circuitry 1308 can include any type of wireless communication device such as one or more transmitters and/or receivers. For example, in an embodiment networking circuitry 1308 may simply be an infrared sensor. In another more complex embodiment networking circuitry 1308 can be Wi-Fi®, Bluetooth® radio, etc.

As illustrated by the figure, in an embodiment, electronics module 1300 may not include networking circuitry 1308 and instead it may include a microphone 1312 and a voice recognition circuitry 1310. Microphone 1312 can be integrated into the housing of electronics module 1300 or 1350 and can be configured to receive spoken commands from a user. The spoken commends can be transformed into electric signals and sent to voice recognition circuitry 1310 for processing. In an embodiment of the present disclosure, voice recognition circuitry 1310 can include a speech recognition integrated circuit. The speech recognition circuit can be trainable or speaker independent and can be configured to determine a command from voice data and send the command to microprocessor 1306. For example, electronics module 1300 can include a speech recognition integrated circuit. In operation, the speech recognition circuit can be configured to recognize simple commands and send command codes to microprocessor 1306. Microprocessor 1306 can be configured parse the input and perform a function in response.

In another exemplary embodiment, voice recognition circuitry 1310 may be effectuated by software instructions that are executed by microprocessor 1306. In this example, the instructions can execute on microprocessor 1306 and when it detects simple commands it can generate command codes indicative of the voice input and send them to microprocessor 1306.

Continuing with the description of the figure, electronics modules 1300 and 1350 can both include an attached light 1316. Light 1316 can be attached to electronics modules 1300 and 1350 by, for example, a flexible shaft. The flexible shaft can be manipulated by a user to position light 1316 so that he or she can easily read display of tablet computing device.

Microprocessor 1306 can be any type of programmable microprocessor such as, for example, a reduced instruction set computer based microcontroller or field-programmable gate array. Microprocessor 1306 can be configured to execute different operations, one of which can be used to control light 1316. For example, microprocessor 1306 can be programmed to change the state of the light from on to off or dimmed in response to user input received from, for example, networking circuitry 1308 or keypad 1318. In the same, or another exemplary embodiment microprocessor 1306 can be configured to change the state of the light after a predetermined amount of time. For example, microprocessor 1306 can be programmed via input received from networking circuitry 1308 or keypad 1318 to turn light 1316 on or off after a user specified amount of time, e.g., 10 minutes, 30 minutes, etc.

Keypad 1318 can be configured to receive user input from a user and send signals indicative of the input to microprocessor 1306. For example, in embodiments electronics modules 1300 and 1350 can be controlled in the event that remote control 1322 has been misplaced or is out of reach and the user does not want to remove the electronics module. Keypad 1318 can include various controls such as, for example, page forward, page backward, power, light, menu, etc. A user can press the keys and interrupts can be generated and send to microprocessor 1306. Microprocessor 1306 can determine which control was pressed and perform a function associated with the control. For example, if a user pressed a light key, microprocessor 1306 would be interrupted and determine that the key was pressed. Microprocessor 1306 can then send a signal to light 1316 to change its state.

In an exemplary embodiment, different types of keys can be integrated into keypad 1318. For example, in an embodiment the keys can be dome-switched keys. For example, when a dome switched key is pressed it can push down on a rubber dome sitting beneath the key. A conductive contact on the underside of the dome can be engaged and touch conductive lines. The identity of the key can be determined and a scan code indicative of the key can be sent to microprocessor 1306. In another exemplary embodiment, the keys of keypad 1318 can be capacitive sensor based keys. In this exemplary embodiment, a user would not have to physically depress a key, instead a user can touch a key icon and distort an electrostatic field. Keypad 1318 can detect the change in the field and determine that the key was touched. Keypad 1318 can then determine which key corresponds to the location and generate a scan code indicative of the key. The scan code can then be sent to microprocessor 1306.

Continuing with the description of FIG. 13, electronics modules 1300 and 1350 can be configured to physically engage controls of a tablet computing device in order to control tablet computing device. Briefly, since each tablet computing device may have a different type of form factor and include different types of keys, a plurality of different shaped electronics modules can be manufactured and sold in kits for an each type of tablet computing device.

As shown by electronics module 1300, in an embodiment a solenoid module 1304 can be used to physically press controls of a tablet computing device. Solenoids are devices that convert energy into linear motion. For example, in response to receiving an electronic impulse a solenoid can move from a first position into a second position. Different types of solenoids exist such as push and pull type solenoids and each type can be used in embodiments of the present disclosure. A pull type solenoid includes a fixed magnetic core and a movable plunger made of a magnetic material. In this embodiment the first position of the plunger extends outward from a housing. A coil of wire can be wrapped around the movable plunger and the plunger can be coupled to a spring. When an electric current is applied, current flows through the wire and a magnetic field is generated around the wire. In a pull type solenoid, the plunger is then pulled to the magnetic core into the second position. When the current is switched off the spring forces the plunger back into the first position. In an embodiment of the present disclosure, the form factor of electronic module 1300 can be designed such that one or more solenoids can strike one or more of the buttons on the tablet computing device.

The device can use a push-type of solenoid that uses a magnetic field to push a plunger outward. In this embodiment, the first position of the plunger is flush with the magnetic core. When an electric current is applied to the wire a magnetic field is generated and the plunger is forced away from the core into the second position. In this exemplary embodiment, springs can force the plunger back to the first position when the current is turned off.

In an embodiment of the present disclosure, the plungers can include protective covers to reduce wear and tear on the controls of a tablet computing device. For example, a protective cover can be made of rubber, felt, foam, etc. In this example the protective cover can reduce the impact received by a key when it is struck by a plunger. In the same, or another embodiment, the solenoids of solenoid module 1304 can include capacitive covers so that they can be used to engage a tablet computing device with a touch based user interface. Capacitive sensors detect anything which is conductive or has dielectric properties. In this exemplary embodiment the end of the plunger can be coated with a material that can alter the transcapacitance coupling on the display, causing the solenoid to be detected.

In an embodiment, solenoid module 1304 can be constructed to use quiet solenoids. For example, solenoids are typically loud due to the noise made when the plunger strikes the magnetic core. Since loud noises are especially undesirable when, for example, the tablet computing device system is used in a hospital setting or in bed while a spouse is sleeping, in an embodiment the solenoids can be made to operate silently. For example, a rubber washer can be added to the plunger so that the noise generated by it striking the magnetic core is reduced. In another embodiment, the plunger can be configured so that it does not strike the magnetic core. In this embodiment the noise due to a striking the magnetic core is eliminated.

In the same, or another embodiment, the electronics module could be used to emulate a swiping gesture used to control a touch-based user interface. In this example, the solenoid can be attached to a track and a motor. When the plunger is extended, the motor can move the plunger on the plunger on the track and across the screen of an inserted touch-based tablet computing device.

Solenoid module 1304 can be controlled by microprocessor 1306. Microprocessor 1306 can be programmed to supply current to solenoid module 1304 based on inputs from networking circuitry 1308, keypad 1318, or a voice recognition circuitry 1310. In a specific example, networking circuitry 1308 can receive one or more wireless signals from remote control 1322 and send them to microprocessor 1306. Microprocessor 1306 can be configured parse the input and determine the identity of the solenoid of solenoid module 1304 the input is associated with. Microprocessor 1306 can then supply a current to the identified solenoid.

Electronics module 1350 can include similar components as electronics module 1300 and can be manufactured in various form factors such that the servos of servo module 1314 can physically engage the physical controls of a tablet computing device. Similar to electronics module 1300, electronics module 1350 can be controlled by user input such as voice received by microphone 1312, radio signals received by networking circuitry 1320, and/or by keypad 1318.

A servo is composed of an electric motor mechanically linked to a potentiometer. Microprocessor 1306 can be configured in this example to send pulse-width modulation signals to a servo which are translated into position commands by electronics inside the servo. In response to receive such a command from Microprocessor 1306, a motor of a servo is powered and the servo is rotated. In this example, a servo can include a lever arm and can rotate along an axis such that it rotates downward into a control of the tablet computing device. In an embodiment where multiple buttons are located next to each other, another lever can be attached to the servo, for example, 180 degrees apart from the first leaver. The servo can be positioned relative to the two physical controls such that when the servo is rotated in one direction one button is pressed and when it is rotated in the other direction the other control is pressed.

Similar to the described solenoids, in an embodiment of the present disclosure the leaver arms of the servos can have protective covers to reduce wear and tear on the controls of a tablet computing device. For example, a protective cover can be made of rubber, felt, foam, etc. In this example the protective cover can reduce the impact received by a key when it is struck by a lever arm. In the same, or another embodiment, the lever arms can include capacitive covers so that they can be used to engage a tablet computing device with a touch based user interface.

Remote control 1322 can be used to control electronics module 1300, electronics module 1350, and in an embodiment of the present disclosure a tablet computing device stand described in more detail below. Remote control 1322 can be configured to comfortably fit in the hand of a user and can include similar components to those described above with respect to electronics module 1300. For example, remote control 1322 can also include Microprocessor 1306, networking circuitry 1320 (which can be similar to networking circuitry 1308), voice recognition circuitry 1310, keypad 1318, and microphone 1312.

As shown by the figure, in an embodiment of the present disclosure microphone 1312 can be used to receive a voice signal from a user. In this exemplary embodiment instead of electronics modules 1300 and 1350 parsing voice signals, remote control 1322 can parse a voice signal and transmit one or more signals indicative of a command to electronics module 1300 and/or 1350. In this exemplary embodiment the conversion from voice to signals can be done in remote control 1322.

Figure 14:
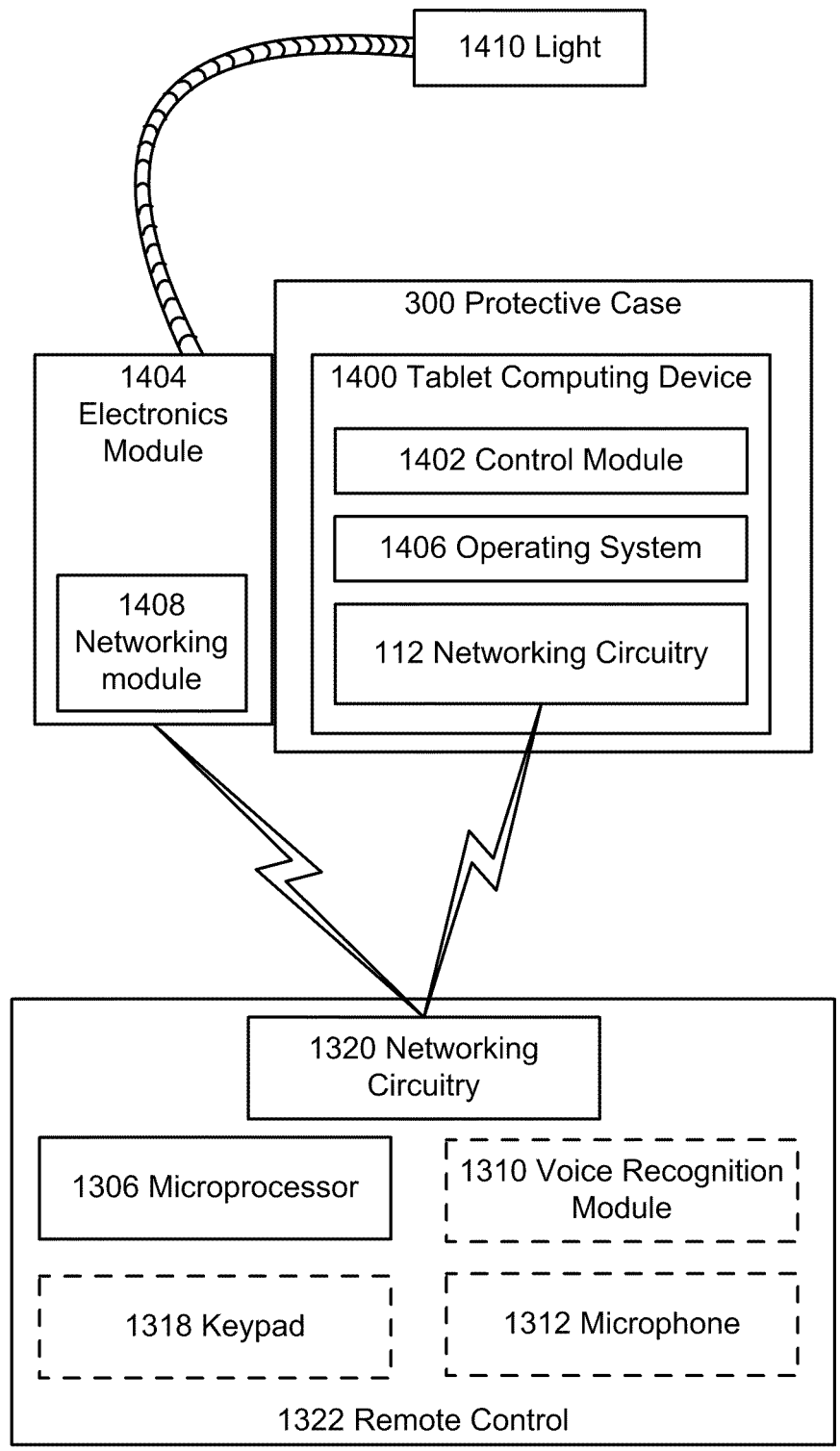
FIG. 14 illustrates a block-diagram of an electronics module 1404 attached to protective case 300.

Turning now to FIG. 14 it illustrates an exemplary tablet computing device 1400 (which can have components similar to exemplary tablet computing device 100 or tablet computing device 200) including a software based control module 1402. As shown by the figure, in this exemplary embodiment electronics module 1404 (either electronics module 1300, 1350, or a different type electronics module) can be attached to protective case 300 similar to that described in FIG. 12. In this exemplary embodiment, control module 1402 could be installed on tablet computing device 1400 and used to control its functions. In this exemplary embodiment, tablet computing device 1400 could include circuitry for remotely controlling it effectuated in part by control module 1402. For example, control module 1402 can be executed by a microprocessor and can register to receive input from networking circuitry 112. In response to receiving a signal from remote control 1322, control module 1402 can access an API of the operating system of tablet computing device 1400 and send a request to perform a function such as, for example, change the displayed page forward to operating system 1406. Operating system 1406 can receive the request and perform the function.

Electronics module 1404 can be configured to receive information sent by networking circuitry 1320 of remote control 1322. In an exemplary embodiment electronics module 1404 can be configured to use the same type of wireless technology as tablet computing device 1400. In this exemplary embodiment, electronics module 1404 can be configured to process different commands for tablet computing device 1400. Thus, in this exemplary embodiment, tablet computing device 1400 and electronics module 1404 can operate on the same frequency.

As shown by the figure, in an exemplary embodiment, electronics module may include light 1410. Electronics module 1404 can receive signals sent from remote control 1322 and turn on light 1410 if it detects such a signal. In this example, if remote control 1322 sends a signal indicative of a request to change a page of an e-book, electronics module 1404 can be configured to ignore it.

In another embodiment, one where electronics module 1404 uses a different type of wireless technology than tablet computing device 1400, remote control 1322 can be configured to send signals using different types of radios. For example, remote control 1322 may use Bluetooth® to send signals to tablet computing device 1400 and electronics module 1404 may use infrared signals. In this example, networking circuitry 1320 of remote control 1322 could include a Bluetooth® radio and an infrared transmitter.

Figure 15:
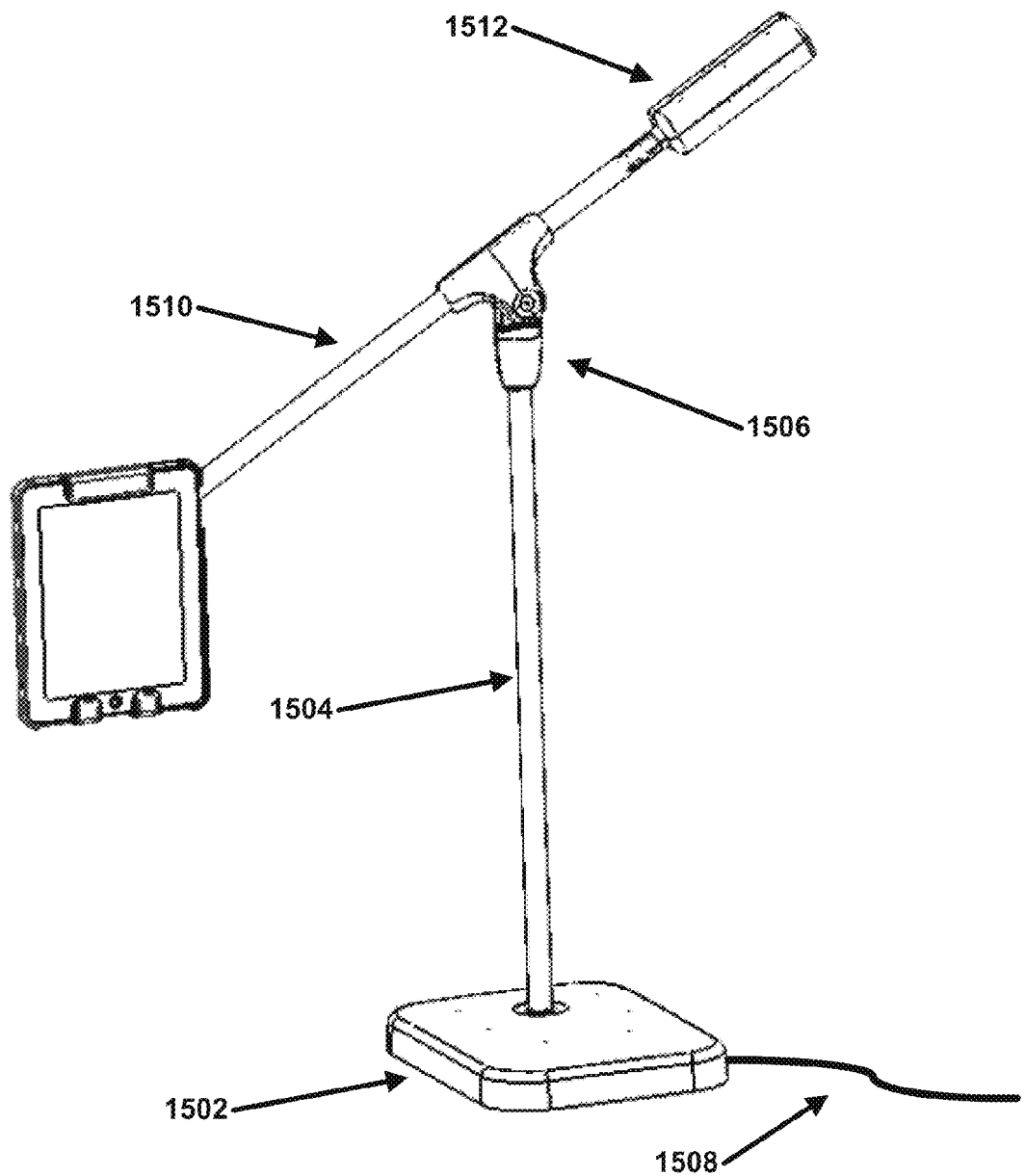
FIG. 15 illustrates an exemplary tablet computing device stand system including a tablet computing device.

FIG. 15 illustrates an exemplary tablet computing device stand system including a tablet computing device. As shown by the figure, the system can include base 1502 coupled to a first end of vertical tube 1504. In an exemplary embodiment, base 1502 can include a top piece of ridged material such as metal or plastic and a bottom piece made of similar material. Base 1502 can be weighted such that it can support the weight of the rest of the stand, protective case 300, and a tablet computing device. In a specific configuration, base 1502 can be filled with sand. Base 1502 can also include one or more ports that input/output IO cables and/or power cables can be run through. Cable 1508, which could be a power cable, and Ethernet cable, a USB® cable, etc., can run through the stand system and come out by the tablet computing device.

Continuing with the description of FIG. 15, vertical tube 1504 can be made of a rigid material such as plastic, steel, bronze, brass, aluminum etc., and be rotatably coupled to vertical tube 1504. Vertical tube 1504 can be a dual-diameter shaft (not shown) such that the length of vertical tube 1504 can be adjusted. Moreover, vertical tube 1504 can include a cylindrical shaft that can be used to run one or more cables such as cable 1508 throughout the stand system.

Figure 16:
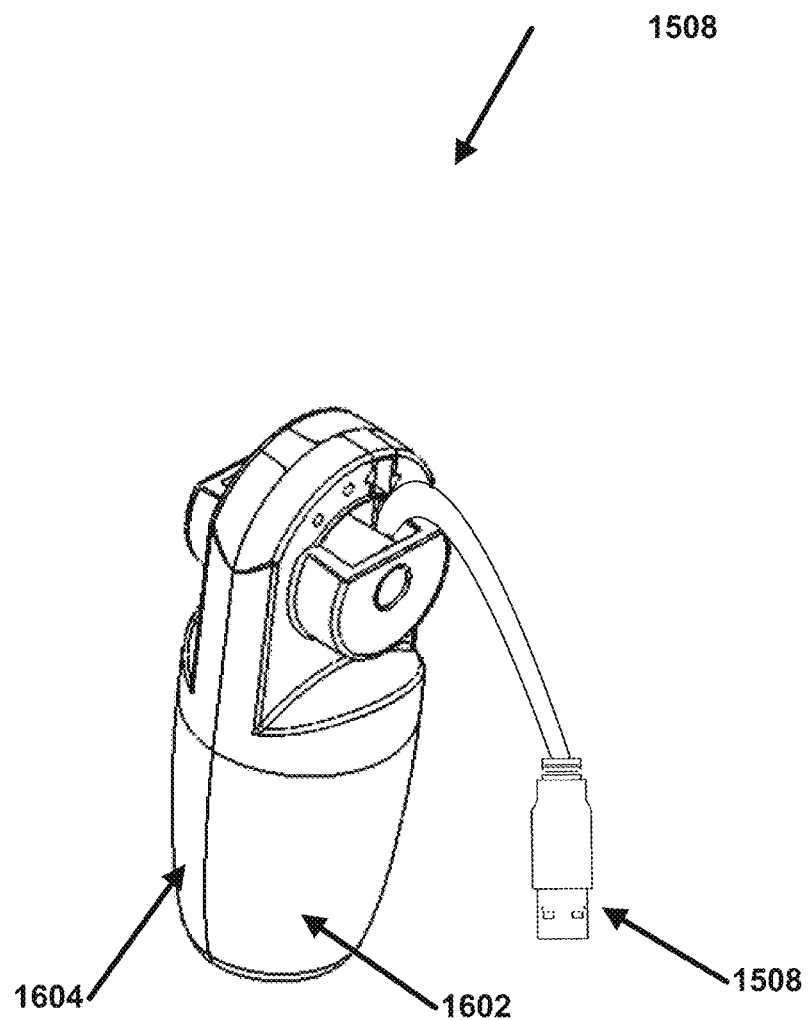
FIG. 16 illustrates an exemplary T-Joint.

On the distal end of vertical tube 1504 a T-joint 1506. As shown by the figure, T-joint can also include bolt, which can be a Chicago bolt that can secure horizontal shaft to vertical shaft. The Chicago bolt can be used to rotate horizontal shaft about an axis defined by the intersection of a transverse plane and a sagittal plane. A mount (not shown) can be attached to the other end of horizontal shaft and can attach protective case 300 to the system. Turning briefly to FIG. 16, it shows that T-joint 1506 can be formed from two identical portions 1602 and 1604. This saves on fabrication costs. FIG. 16 additionally shows how cable 1508, which in the illustrated example is a USB® cable, can extend through a hole defined by the Chicago bolt and can be run into horizontal tube 1510.

Figure 17:
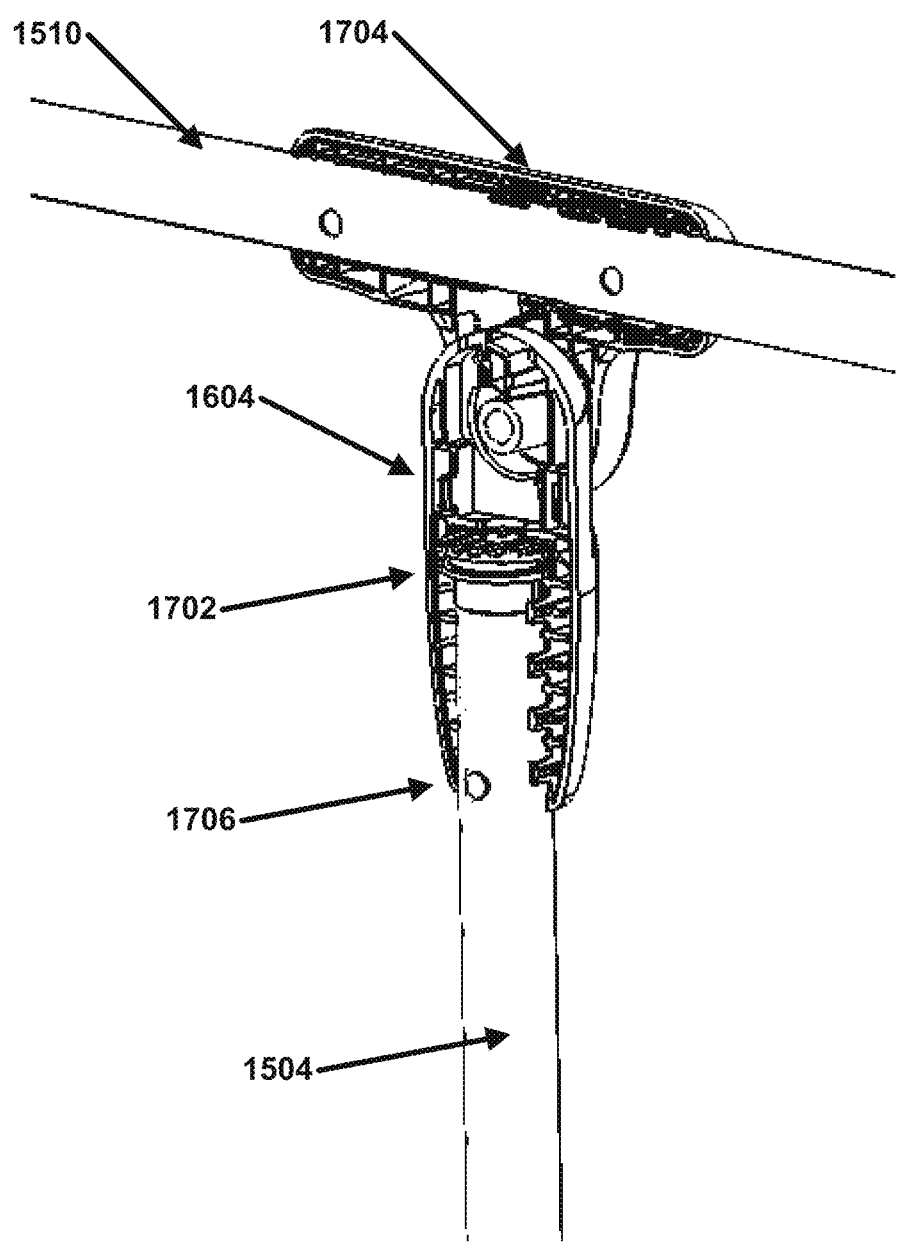
FIG. 17 illustrates a cross section view of T-joint and a part of an exemplary stand system.

Referring now to FIG. 17, it shows a cross section view of T-Joint 1506 and horizontal mount 1704. An insert can be inserted into the end of vertical tube 1504 and it can include a part that can be inserted within vertical tube 1504 that can include one or more ball detents such as ball detent 1706. The ball detents of insert can be inserted into holes to secure the insert to vertical tube 1504. The other end of insert can include swivel (which can include a hole so cables can run through) 1702, which can rotate T-joint 1506 horizontally about an axis defined by the intersection of a plane that is parallel to the midsagittal plane and a plane parallel to the frontal plane. Horizontal mount 1704 can attach to the Chicago bolt, which can be configured to vertically rotate horizontal tube 1510 about an axis defined by the intersection a plane parallel to the midsagittal plane and a plane parallel to the transverse plane.

Turning back to FIG. 15, the distal end of horizontal tube 1510 can be coupled to protective case 300 and the proximal end can include counterbalance 1512. In an exemplary configuration counterbalance can be used to help those users that may have difficulty (due to age or illness) manipulating the stand system. For example, counterbalance can be used to minimize the amount of tension needed on the Chicago bolt to keep protective case 300 in place. In one configuration, the weight of counterbalance can be selected such that the force pulling protective case 300 clockwise (relative to the view of the figure) can be equal to force pulling protective case 300 counterclockwise. In a specific example, counterbalance 1512 can include steel shot or the like and three pounds of steel shot can be used to balance a 1.6 pound tablet computing device.

Figure 18:
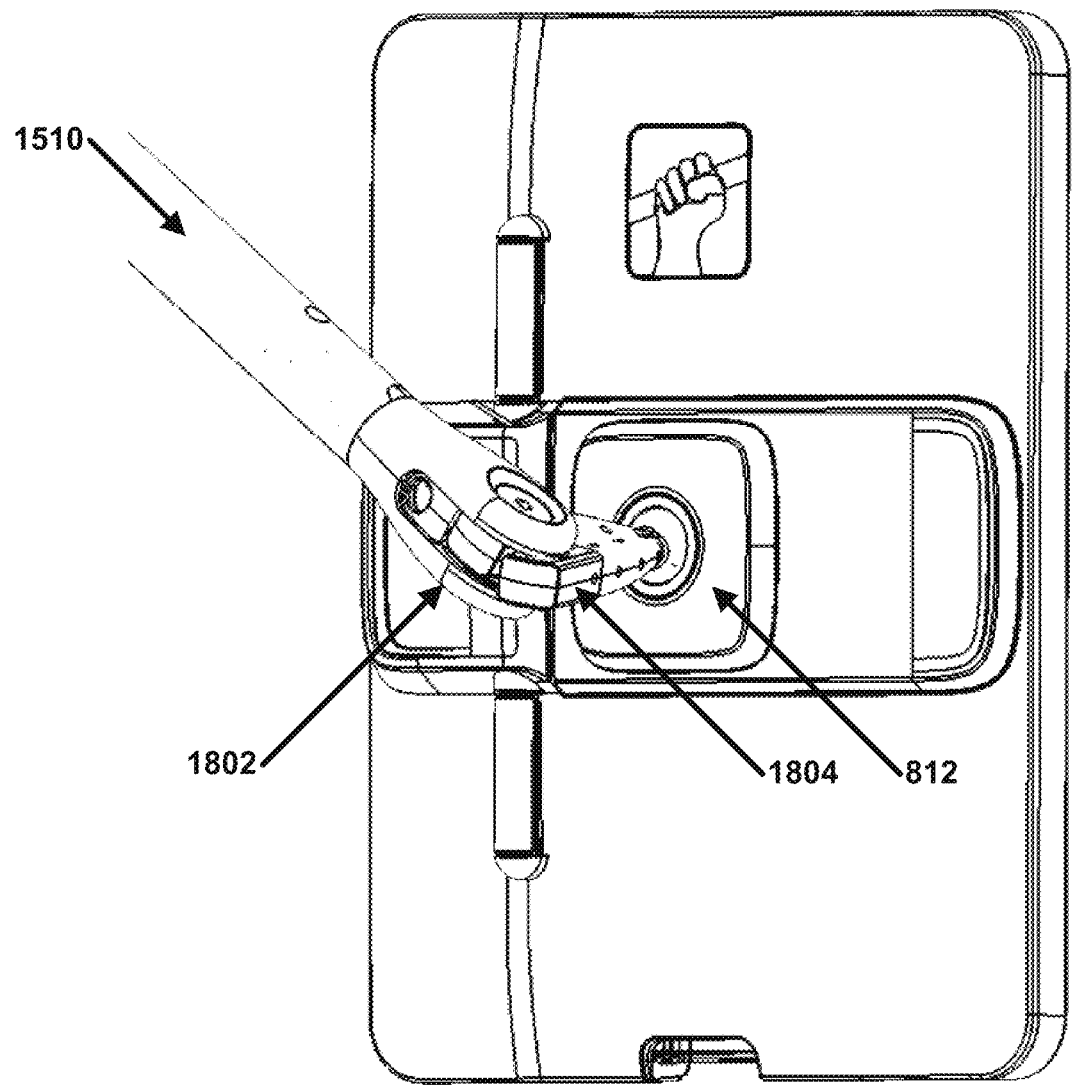
FIG. 18 illustrates an exemplary mounting system.

Referring now to FIG. 18, it illustrates the distal end of horizontal tube 1510 and an exemplary mounting system that can be used to couple the stand to protective case 300. Arm joint 1802 can be inserted into the distal end of horizontal tube 1510 and one or more ball detents or a rivet can be used to connect it to horizontal tube 1510. Similar to T-joint, arm joint 1802 can attach to a swivel that allows rotational movement. Arm 1804 can be coupled to arm joint 1802 via a Chicago bolt and arm 1804 can rotate. The end of arm 1804 can be formed to define ball that can be inserted into a socket of ball and socket mounting 812.

Figure 19A:
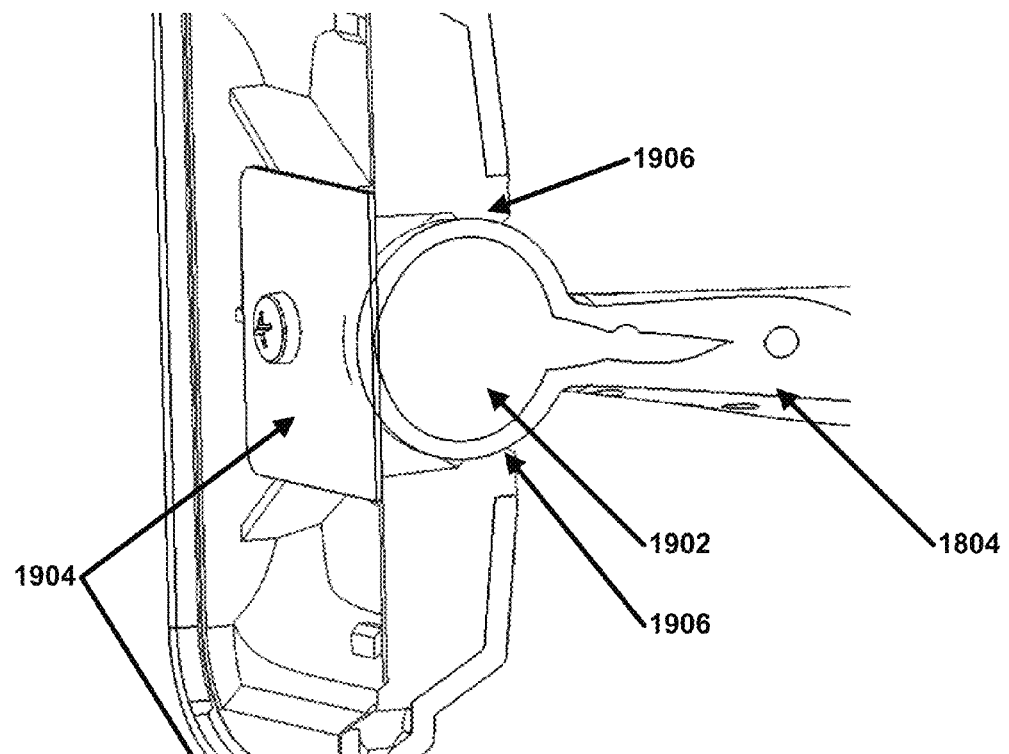
FIG. 19A illustrates a cross-sectional view of ball and socket mounting.

Referring now to FIG. 19A, it shows a cross-sectional view of ball and socket mounting 812. As shown by the figure, arm 1804 can define ball 1902, which can be held in place by friction caused by contact with plate 1904 and socket mounting 812, which defines a ring of contact 1906 around the ball. Ball 1902 allows a user to orient protective case 300 in multiple configurations and allows for 360 degrees of rotation about an axis defined by the intersection of a plane parallel to the midsagittal plane and a plane parallel to the transverse plane. As such, a user can rotate protective case 300 such that it orients an inserted tablet computing device to landscape or portrait configurations. The thickness of plate 1904 is of consideration and needs to be selected appropriately. For example, if it is too thick a user will be unable to use one finger to move it. In a specific example, plate can be made from plain steel and can be about 0.55 millimeters in thickness.

Figure 19B:
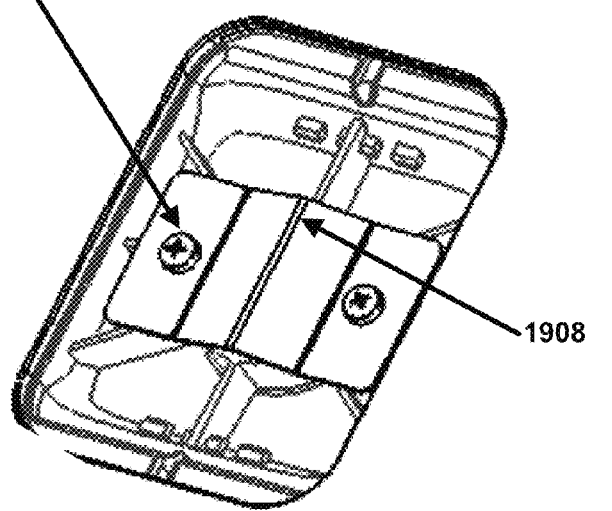
FIG. 19B illustrates an exemplary plate of the exemplary ball and socket mounting.

In addition to plate thickness, the amount of plate 1904 that is contact with ball 1902 also affects how easily it is rotated. In an exemplary configuration, plate 1904 can be substantially flat, i.e., substantially parallel with the frontal plane. In an alternative configuration, as illustrated by FIG. 19B, plate 1904 can be shaped to define protrusion 1908 that adjoins ball 1902 and thereby provides more surface area that ball 1902 is in contact with. This increases the amount of force needed to move protective case 300 relative to when plate 1904 is substantially flat. The combination of plate thickness can be selected to make it easier for a user with a condition that affects muscle coordination and/or strength to rotate protective case 300 with use of one finger. For example, a fully extended index finger can exert about 43N of force with the pad or any other side. Consequently, in an embodiment plate 1904 can be selected such that a force of less than 43N is needed to rotate protective case 300. In a specific example, the force needed to rotate protective case 300 is about 9N.

Figure 20:
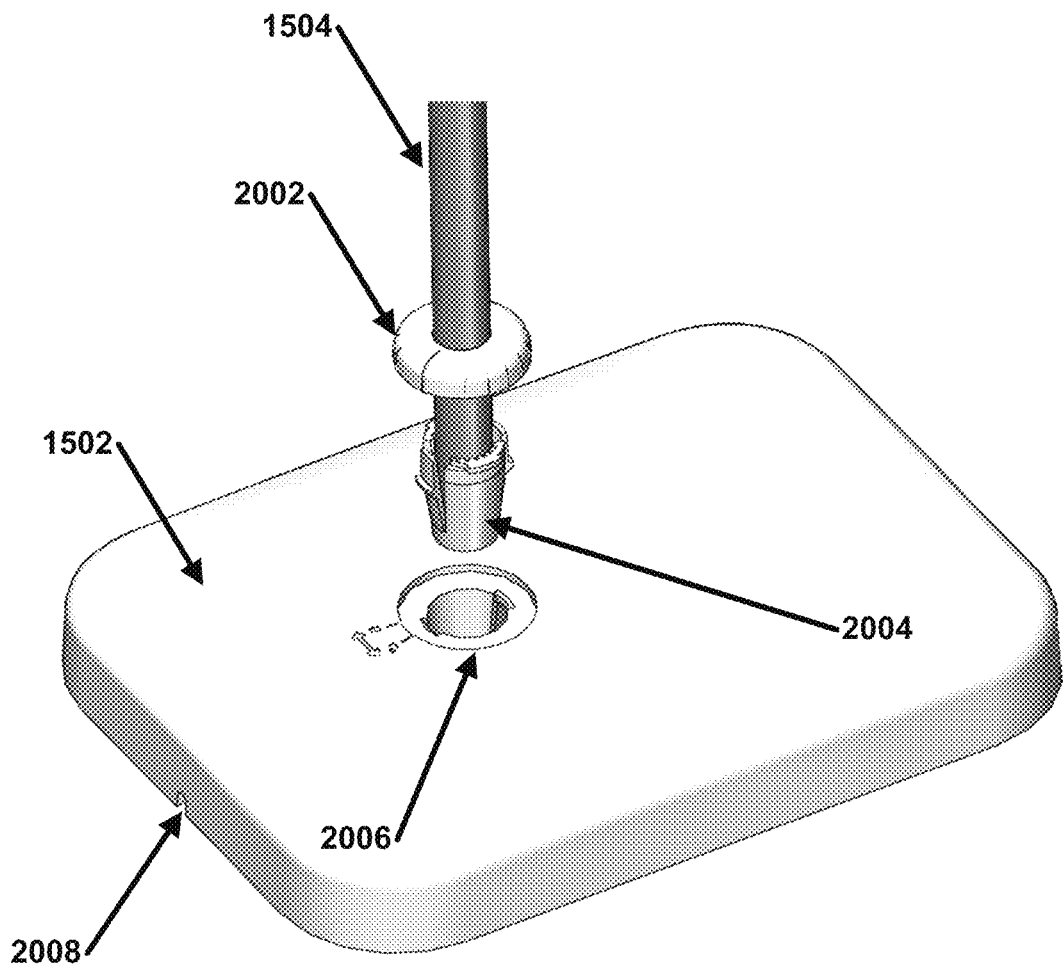
FIG. 20 illustrates an exemplary base.

Turning now to FIG. 20, it illustrates base 1502 in more detail. In an exemplary embodiment, base 1502 can be formed to define a cylindrical hole 2006 that extends through base 1502. A cable, such as USB cable 1508, can run through cylindrical hole 2006 and up through vertical tube 1504 and the other end can exit cylindrical hole 2006. Tube insert 2004 can be operatively coupled to the end of vertical tube 1504. In an exemplary embodiment, a rivet can extend through vertical tube 1504 and attach to tube insert 2004. When tube insert 2004 is attached to base 1502, a user can slide base cap 2002 down vertical tube 1504 until it rests on top of tube insert 2004. A user can then rotate base cap 2002 clockwise and a lock base cap 2002.

Figure 21A:
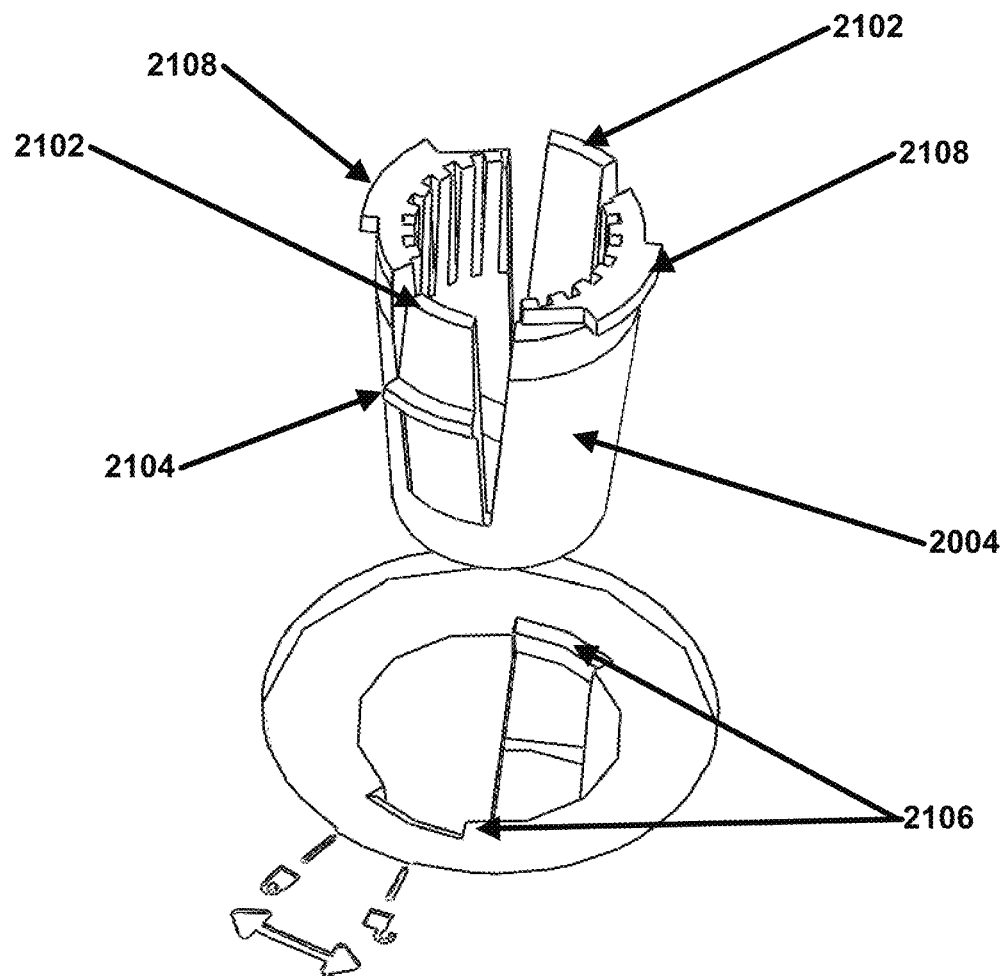
FIG. 21A illustrates an exemplary tube snap in more detail.
Figure 21B:
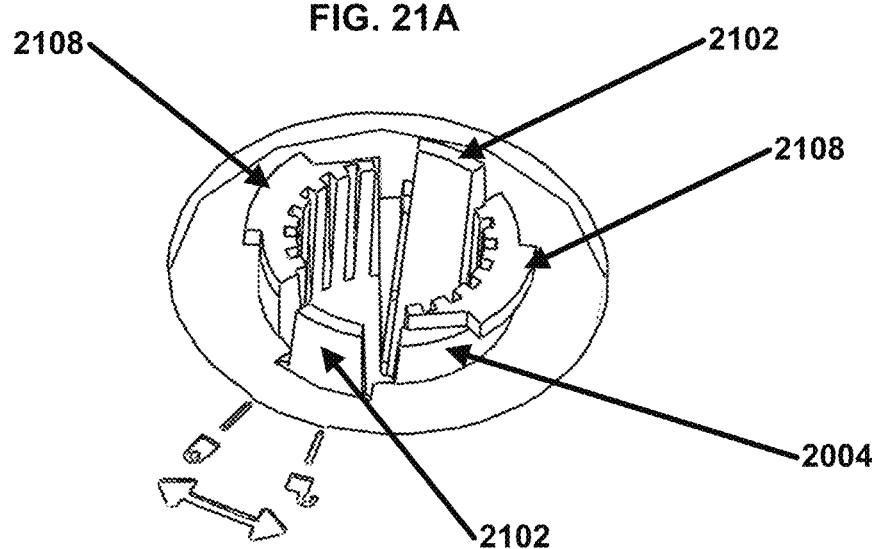
FIG. 21B illustrates an exemplary tube snap attached to an exemplary base.

Turning to FIGS. 21A and 21B, these figures illustrate how tube insert 2004 can be inserted into base 1502 in more detail. A user or the like may attach vertical tube 1504 to base 1502 by inserting tube insert 2004 into cylindrical hole 2006. As tube insert 2004 is inserted within cylindrical hole 2006, plastic tabs 2102 will be deformed inward toward vertical tube 1504 by beveled edges 2106 until flanges 2104 pass beveled edges 2106. When flanges 2104 pass beveled edges 2106, plastic tabs 2102 will expand and lock tube insert 2004 in place. Cap flanges 2108 can be used to lock base cap 2002 onto tube insert 2004. For example, the underside of base cap 2002 can include protrusions. When base cap 2002 is rotated the protrusions can move underneath cap flanges 2108. If a user chooses to remove vertical tube 1504, a user can grip the ends of plastic tabs 2102 and squeeze them so as to deform plastic tabs 2102. This allows flanges 2104 to be moved passed beveled edges 2106. The user can then pull vertical tube 1504 out of base 1502.

Figure 22:
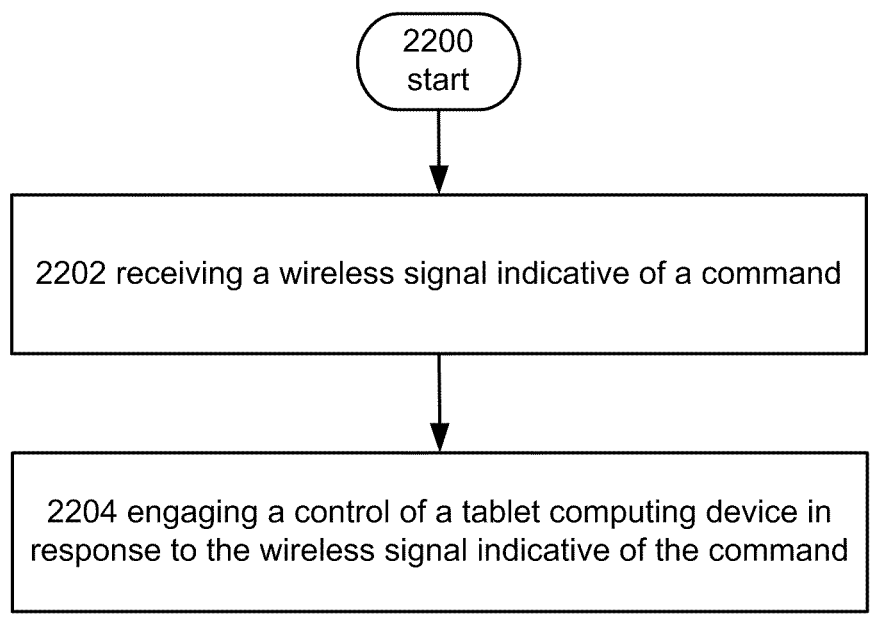
FIG. 22 illustrates an operational procedure.

FIG. 22 illustrates an operational procedure for practicing aspects of the present disclosure. FIG. 22 includes operations 2200, 2202, and 2204. Turning to operation 2200, it begins the operational procedure and operation 2202 shows receiving a wireless signal indicative of a command. For example, in an embodiment of the present disclosure and turning to FIG. 13, an electronics module 1300 or 1350 can receive a wireless signal from, for example, remote control 1322. The wireless signal can be indicative of a command such as a command for a tablet computing device such as "forward page." In response to the command, microprocessor 1306 can receive an electronic signal and execute a program. Microprocessor 1306 can be configured by the signal to select a mechanical button pusher device configured to press a control of the tablet computing device. For example, the mechanical button pusher can be placed over a physical control of the tablet computing device that causes the tablet computing device to advance a page of a displayed e-book.

In another specific example, the mechanical button pusher can be placed over a portion of a touch screen that includes a virtual button indicative of, for example, a button that pauses/plays a video. In this example, the proximal end of the mechanical button pusher can include a capacitive cover that simulates a human's finger.

Continuing with the description of FIG. 22, operation 2204 shows engaging a control of a tablet computing device in response to the wireless signal indicative of the command.

Turning back to FIG. 13, Microprocessor 1306 can send a signal to a mechanical button pusher, which could be a servo or a solenoid. The mechanical button pusher can strike the control. Tablet computing device can detect the impact caused by mechanical button pusher device and determine that a key was pressed. In response tablet computing device can execute an action associated with the key.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

What is claimed is:

1. A protective case system configured to store a tablet computing device, comprising:
    a protective case including:
        a first housing including a first L-retainer and a first retainer protruding in a direction generally perpendicular to a front surface of the first housing;
        a second housing including a second retainer protruding in a direction generally perpendicular to a front surface of the second housing;
        a locking mechanism comprising a carriage coupled to a back surface of the second housing, the locking mechanism configured to lock the second housing in a closed position by positioning the carriage to cover a portion of a back surface of the first housing upon the first and second housings being substantially coplanar in side-by-side arrangement and the front surface of the second housing is generally flush with the front surface of the first housing; and
        a hinge coupling a first side edge of the first housing to a second side edge of the second housing;
        wherein the hinge is configured to enable rotation of the second housing about a first axis when the locking mechanism is articulated into an open position, the first axis defined by an intersection of a plane parallel to a midsagittal plane and a frontal plane.

2. The protective case system of claim 1, wherein the locking mechanism further comprises:
    a spring coupled to both the carriage and the back surface of the second housing, the spring configured to exert a force on the carriage in a direction toward the midsagittal plane, the spring operable to cause the carriage to cover the portion of the back surface of the first housing when the front surface of the second housing is generally flush with the front surface of the first housing; and
    a torsion spring coupled to both the first housing and the second housing, the torsion spring configured to exert a force on the second housing such that the torsion spring is operable to rotate the second housing about the first axis when the carriage is not covering the portion of the back surface of the first housing.

3. The protective case system of claim 2, wherein the locking mechanism further comprises:
    a sloped stop coupled to the back surface of the first housing, the sloped stop including a ridge, a flat surface, and a sloped surface;
    wherein the spring is configured to force the carriage up the sloped surface and over the ridge when the front surface of the second housing is substantially flush with the front surface of the first housing; and
    wherein the sloped surface is angled such that it allows the force exerted by the spring onto the carriage to move the carriage up the sloped surface and over the ridge.

4. The protective case system of claim 1, wherein the first side edge is formed to define a barrel for the hinge, the barrel including a stop operable to restrict rotation of the second housing about the first axis, wherein the second side edge is formed to define a hollow cylinder operable to couple to the barrel.

5. The protective case system of claim 1, further comprising:
    a stand configured to be coupled to the protective case.

6. The protective case system of claim 5, wherein the stand is configured to be coupled to a bed.

7. The protective case system of claim 5, wherein the stand is configured to be coupled to a chair.

8. The protective case system of claim 5, wherein the stand is configured to be coupled to a wall.

9. The protective case system of claim 5, wherein the stand is tubular and comprises an inner side, the protective case system further comprising:
    an input output cable and/or a power cord coupled to the inner side of the stand, the input output cable and/or the power cord running through the stand.

10. The protective case system of claim 5, wherein the stand comprises:
    a ball and socket joint, the ball and socket joint coupled to the protective case;
    a horizontal tube coupled to the ball and socket joint;
    a T-joint coupled to the horizontal tube;
    a vertical tube coupled to the T-joint; and
    a base coupled to the vertical tube.

11. The protective case system of claim 10, wherein the base is formed to define a cylindrical hole including a plurality of beveled edges, the stand further comprising:
    a tube insert coupled to the vertical tube at an end of the vertical tube opposite the T-joint, the tube insert including a plurality of tabs, each tab including a flange, wherein the flanges are operable to engage the plurality of beveled edges and removably couple the vertical tube to the base.

12. The protective case system of claim 1, further comprising:
    a U-shaped electronics module coupled to the back surface of the first housing or the back surface of the second housing, the U-shaped electronics module including a button pusher suspended over at least a portion of the front surface of the first housing or at least a portion of the front surface of the second housing.

* * * * *